United States Patent
Jin et al.

(10) Patent No.: US 9,263,939 B2
(45) Date of Patent: Feb. 16, 2016

(54) CAPACITOR DISCHARGING CIRCUIT AND CONVERTER

(75) Inventors: Hongyuan Jin, Shanghai (CN);
Baochen Wang, Shanghai (CN);
Hongjian Gan, Shanghai (CN);
Jianping Ying, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 833 days.

(21) Appl. No.: 13/466,670

(22) Filed: May 8, 2012

(65) Prior Publication Data

US 2013/0188401 A1    Jul. 25, 2013

(30) Foreign Application Priority Data

Jan. 20, 2012    (CN) .......................... 2012 1 0019920

(51) Int. Cl.
*H02M 3/335*    (2006.01)
*H02M 1/42*    (2007.01)
*H02H 3/14*    (2006.01)
*H02M 1/32*    (2007.01)

(52) U.S. Cl.
CPC .............. *H02M 1/4225* (2013.01); *H02H 3/14* (2013.01); *H02M 1/4258* (2013.01); *H02M 2001/322* (2013.01); *Y02B 70/126* (2013.01)

(58) Field of Classification Search
CPC ................. H02H 3/14; H02M 1/4225; H02M 2001/322; H02M 1/4258
USPC ................. 323/222, 205, 207, 266, 288, 320; 363/89
See application file for complete search history.

(56) References Cited

U.S. PATENT DOCUMENTS

| | | | |
|---|---|---|---|
| 2005/0248968 A1 | 11/2005 | Chang | |
| 2010/0014330 A1* | 1/2010 | Chang ................. | H02M 1/4225 363/89 |

(Continued)

FOREIGN PATENT DOCUMENTS

| | | |
|---|---|---|
| CN | 101465548 A | 6/2009 |
| CN | 201489092 U | 5/2010 |
| CN | 101873073 A | 10/2010 |

(Continued)

OTHER PUBLICATIONS

"First Office Action" issued by the State Intellectual Property Office of The People's Republic of China on Dec. 8, 2014.

(Continued)

*Primary Examiner* — Adolf Berhane
*Assistant Examiner* — Afework Demisse
(74) *Attorney, Agent, or Firm* — Yunling Ren; Eaton & Van Winkle

(57) ABSTRACT

A capacitor discharging circuit and a converter are disclosed. The converter comprises: a capacitor connected between the live line and null line of an AC power input terminals, a conversion module coupled to the capacitor and comprising an energy storage component at least, an energy transfer unit coupled with the energy storage component and the capacitor, an AC power-off detecting unit and a control unit; wherein the energy transfer unit comprises a switch device; when AC power is disconnected, the AC power-off signal triggers the control unit to output a switch driving signal, controlling the operation of the energy transfer unit to transfer the energy stored in the capacitor to the energy storage component to discharge the capacitor.

22 Claims, 14 Drawing Sheets

(56) References Cited

U.S. PATENT DOCUMENTS

2010/0124429 A1* 5/2010 Ishikawa .......................... 399/69
2011/0025278 A1* 2/2011 Balakrishnan .......... H02M 1/32
                                                          320/166

FOREIGN PATENT DOCUMENTS

| CN | 201758349 U | 3/2011 |
| CN | 1019891310 A | 3/2011 |
| CN | 102263516 A | 11/2011 |
| TW | 201036312 A | 10/2010 |
| TW | M416271 U | 11/2011 |

OTHER PUBLICATIONS

"First Office Action" issued by the Intellectual Property Office, Ministry of Economic Affairs, R.O.C. dated Sep. 26, 2014, Taiwan.
Office Action issued Aug. 10, 2015 by the CN Office.

* cited by examiner

CAPACITOR DISCHARGING CIRCUIT AND CONVERTER

CROSS REFERENCE TO RELATED APPLICATIONS

This application claims priority under 35 U.S.C. §119(a) to the Chinese patent application No. 201210019920.9, filed on Jan. 20, 2012, which is incorporated herein by reference in its entirety.

FIELD OF THE INVENTION

The present invention generally relates to power electronic technology, and more particularly to a capacitor discharging circuit and a converter comprising the capacitor discharging circuit.

BACKGROUND OF THE INVENTION

Under normal circumstance, in order to meet the requirement of electromagnetic compatibility, a filter configuration comprising a capacitor is connected between AC power and the electronic devices. In compliance with the "safety of information technology equipment" standard, the capacitor is a safety capacitor which comprises X-capacitors and Y-capacitors. X-capacitor is connected between L line (Live line) and N line (Null line) of the input terminals of AC power.

Specifically positioned, X-capacitor will be charged upon the introduction of AC power, and will store energy in power plug when AC power is disconnected, which is likely to induce current leakage or make the enclosure charged to endanger user safety. Therefore, X-capacitor should be discharged rapidly in the event of AC power disconnection, and furthermore, the design of X-capacitor discharging circuit should meet related safety standard.

To comply with the "safety of information technology equipment" standard, one should ensure that the stored electric charge in a capacitor component of primary circuit is reduced to a minimal when designing electrical equipments at the external disconnection position of AC power. Specifically, if an electrical equipment is provided with a capacitor in the primary circuit, and if rated or nominal capacitance is more than 0.1 μF and the discharge time constant of the capacitor is not more than the following specified values, the electrical equipment will be considered as qualified:

a) 1 second, for pluggable equipment of A type, and
b) 10 seconds, for equipment of permanent connection and pluggable equipment of B type;

Wherein, the discharge time constant refers to a calculation from equivalent capacitance (μF) and equivalent discharge resistance (MΩ). That is to say, after a time period which equals to the discharge time constant, the voltage will reduce to 37% of its initial value.

In usual ways, discharging resistor is used to connect in parallel with X-capacitor and the time constant of capacitor and resistor should be less than the specified value to meet the rules concerning capacitor discharge in "safety of information technology equipment". Next, the X-capacitor discharging technology in the prior art will be described using an example that an X-capacitor is comprised in a converter circuit.

FIG. 1 shows a circuit schematic diagram of a converter with an X-capacitor in the prior art, in which a discharging resistor is connected in parallel with the X-capacitor. As shown in the figure, an X-capacitor 2, a discharging resistor 3 and a converter module 1 are coupled successively, and the X-capacitor 2 is connected in parallel between the input terminals (between L line and N line) of AC power. The converter with the X-capacitor in the prior art is the same as other electrical equipment in which a discharging resistor is connected in parallel between the two terminals of the X-capacitor, i.e. high voltage energy is stored in the X-capacitor 2 for long time in the event of AC power disconnection, the discharging resistor 3 is used to provide discharging path for the X-capacitor 2 to meet the safety requirement.

However, the discharging resistor 3 connected in parallel in the circuit will consume energy all along and induce energy consumption, especially, the energy consumption will become greater when the input voltage being higher, which is an important factor leading to the energy consumption of the converter during standby mode and no-load mode. With the increasing requirement of efficiency at the light load mode, it is more and more important to minimize the energy consumption caused by the discharge of the X-capacitor 2.

Furthermore, the converter module 1 can be composed of a power factor correction (PFC) conversion unit and a DC/DC conversion unit. It should be stressed that the two-stage conversion module having a bridgeless PFC conversion unit has much higher efficiency in the case of heavy load due to the advantage of topology, compared to the conventional PFC conversion unit having a bridge diode structure, but the X-capacitor having greater capacitance needs to be used. If the discharging resistor is used to discharge the X-capacitor, the resistor having relative low resistance is preferred. The lower the resistance is, the greater the energy consumption of the discharging resistor is when AC power is introduced, which could lead to lower efficiency of the bridgeless PFC conversion unit in the light load mode. Therefore, it becomes more and more urgent to solve the problem of the energy consumption induced by discharge of the X-capacitor.

Consequently, to meet the requirement of "safety of information technology equipment" and meanwhile to achieve high efficiency of electrical equipments especially in the light load mode is becoming a pressing problem needs to be resolved.

SUMMARY OF THE INVENTION

In view of the severe energy consumption caused by discharging resistor which the previous solution requires, the present application, in part, seeks to avoid the energy consumption of discharging resistor when AC power is introduced, and proposes a solution to discharge X-capacitor through an energy transfer unit when AC power is off without using a discharging resistor, thereby, the energy consumption of the discharging resistor used for discharging X-capacitor is reduced, and the efficiency in the light load mode is enhanced.

In one aspect, this application is stated by providing a converter, comprising: a capacitor connected between the live line and the null line of AC power input terminals; a conversion module coupled to the capacitor and at least comprising an energy transfer unit and an energy storage component; an AC power-off detecting unit connected with the AC power input terminals which detects on-off status of AC power and generates an AC power-off signal; and a control unit coupled to the AC power-off detecting unit; wherein, the energy transfer unit comprises a switching device and is coupled to the capacitor and the energy storage component; when the disconnection of AC power is detected by the AC power-off detecting unit, the AC power-off signal outputted from the AC power-off detecting unit triggers the control unit to output a switch driving signal, which controls the operation of the energy transfer unit to transfer the energy stored in the capacitor to the energy storage component in the conversion module, so that the capacitor is discharged.

In another aspect, this application is stated by providing a capacitor discharging circuit, used to discharge the capacitor between the live line and the null line of an AC power input terminals connected with a converter; wherein the converter comprises a conversion module coupled to the capacitor which comprises at least an energy transfer unit and an energy storage component, an AC power-off detecting unit connected to the AC power input terminals of the converter, which detects on-off of AC power and generates an AC power-off signal, and a control unit; the energy transfer unit comprises a switching device and is coupled to the capacitor and the energy storage component, the control unit is coupled to the AC power-off detecting unit; when disconnection of AC power is detected by the AC power-off detecting unit, the AC power-off signal outputted from the AC power-off detecting unit triggers the control unit to output a switch driving signal, which controls the operation of the energy transfer unit to transfer the energy stored in the capacitor to the energy storage component in the conversion module, so that the capacitor is discharged.

As can be seen from the technical solution stated above, the capacitor between the live line and the null line of the AC power input terminal connected with the converter is discharged by the energy transfer unit, not by a discharging resistor, which is one of the features of the present application. When AC power is introduced, the conversion module performs power conversion as its original design; when AC power is disconnected, the control unit controls the energy transfer unit to transfer the energy stored in the capacitor between the live line and the null line of the AC power input terminals connected with the converter to the energy storage component of the conversion module, so as to achieve rapid discharge for the capacitor. In this way, the technical solution of the present invention meets the requirement of "safety of information technology equipment", and enhances the efficiency of electrical equipments.

In addition, the energy transfer unit, which realizes rapid discharge for the capacitor connected between the live line and the null line of the AC power input terminals connected with the converter, can also be part of the original conversion unit of the conversion module in the converter. Thus, the circuit is simplified and the light load efficiency is enhanced. The above solution is advantageous to the converter having structure of bridge PFC conversion unit, especially, it offers a great help to enhance the light load efficiency of the converter having the bridgeless PFC conversion unit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE EMBODIMENTS

Some exemplary embodiments explaining the features and advantages of the present invention will be stated in detail in the following description. It is to be understood that different embodiments of the present invention have a variety of variations, which will fall within the scope of the present invention, and the description and figure showing are essentially used to explain the present invention, but not to limit the present invention.

The features and beneficial effects mentioned above, as well as other features and effects will be described in detail with embodiments of the capacitor discharging device of the present invention and the converter comprising the capacitor discharging device considered in conjunction with the attached FIGS. 2-23.

For an AC-AC and/or an AC-DC converter, a filter structure is usually coupled between the AC power input terminals. According to the requirement of "safety of information technology equipment", the capacitor of the filter will be discharged when AC power is removed, and there are some other capacitors in the converter need to be discharged, moreover, the capacitors need to be discharged could be composed of multi capacitors connected in parallel or in series. In the following, the operating principle will be stated by an example of an AC-DC converter comprising the capacitors need to be discharged, wherein the capacitor needs to be discharged is the X-capacitor mentioned above.

Figure 1:
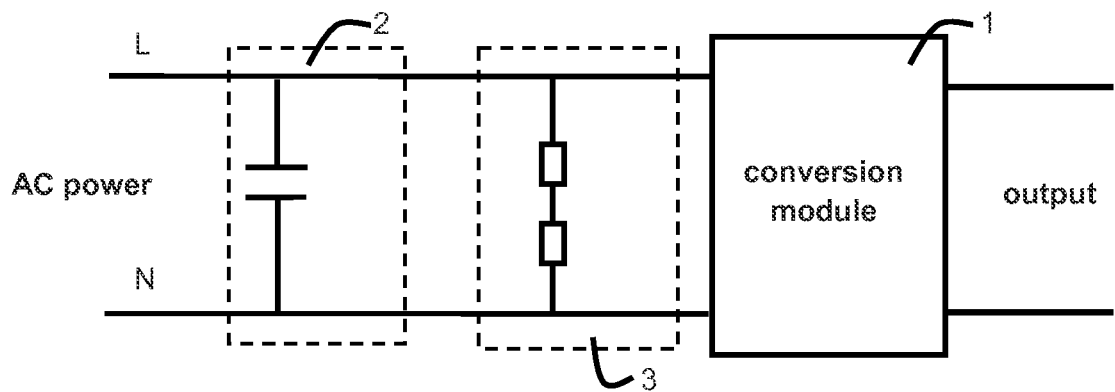
FIG. 1 is a circuit schematic diagram of a converter having an X-capacitor and having a discharging resistor connected in parallel with the capacitor in the prior art
Figure 2:
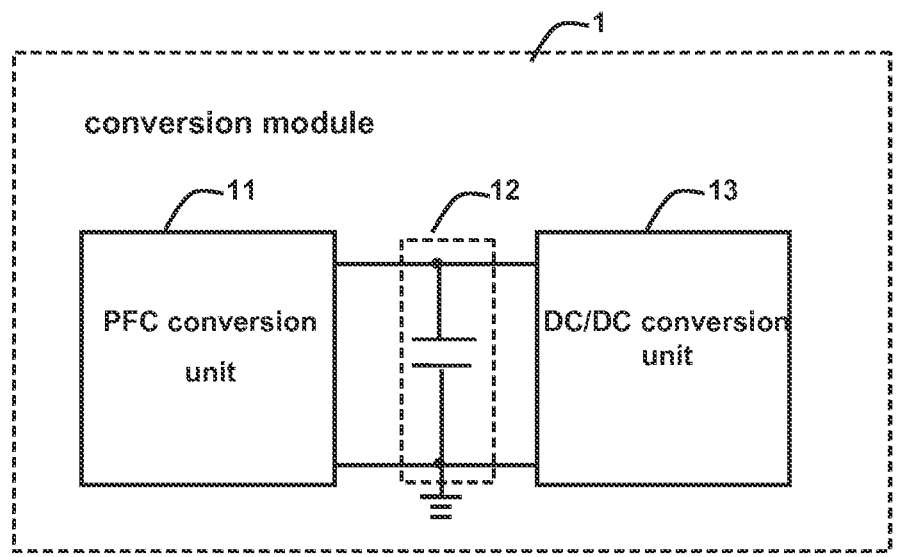
FIG. 2 is a circuit schematic diagram of an AC-DC conversion module included in a converter having an X-capacitor of an embodiment of the present invention

The AC-DC converter usually comprises an X-capacitor 2 which needs to be discharged and a conversion module 1 which is connected with the X-capacitor 2. In an embodiment of the present invention, as shown in FIG. 2, the conversion module 1 could be composed of a power factor correction (called PFC for short) conversion unit 11 and a DC/DC conversion unit 13, between which a bus capacitor 12 is coupled. In an embodiment of the present invention, the conversion module 1 also could be a conversion module of the single-stage flyback conversion unit shown in FIG. 3, wherein the capacitor 311 is the output capacitor. In other embodiments, the conversion module 1 also could be a conversion module of other single-stage conversion units.

In an embodiment of the present invention, the PFC conversion unit 11 shown in FIG. 2 could be either a bridge PFC conversion unit (shown in FIG. 4) or a bridgeless PFC conversion unit (shown in FIG. 5), and the PFC conversion unit 11 could be selected from one of a boost PFC conversion unit, a buck PFC conversion unit, and a buck-boost PFC conversion unit.

Figure 4:
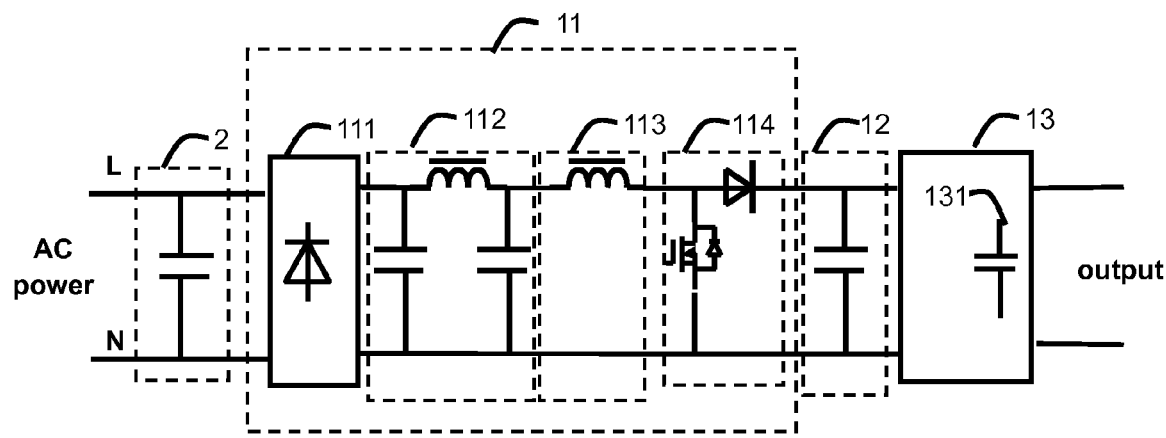
FIG. 4 is a circuit structure diagram of a conversion module comprising a bridge PFC conversion unit of an embodiment of the present invention

The circuit structure diagram of the conversion module including a bridge PFC conversion unit in an embodiment of the present invention is shown as FIG. 4. As shown in the figure, the conversion module 1 comprises the bridge PFC conversion unit 11, a DC/DC conversion unit 13 and a bus capacitor 12, wherein the PFC conversion unit 11 is a boost PFC conversion unit which comprises following parts coupled in sequence: a rectifying bridge 111, a π type filtering unit 112 which is not necessary, a PFC inductor 113 and a switch diode network 114. Because the PFC inductor 113 of the bridge PFC conversion unit 11 is located in the downstream of the rectifying bridge 111, the capacitor of the π type filtering unit 112 could be a non-safety capacitor, however, the π type filtering unit 112 has the effect of differential filter and is not directly connected with the AC power input terminals, so the capacitance of the X-capacitor 2 coupled in the input terminals can be reduced. Thus, the X-capacitor 2 coupled in the input terminals can have low capacitance value relatively.

Figure 5:
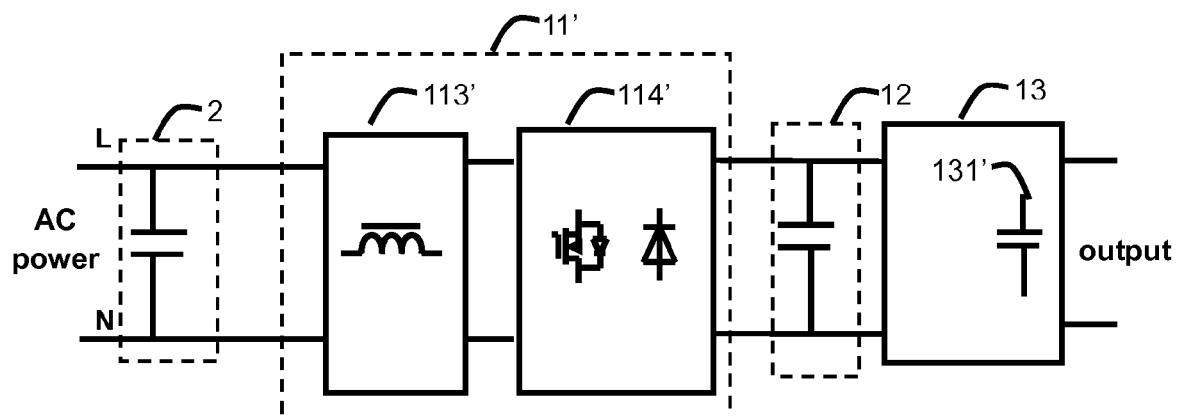
FIG. 5 is a circuit structure diagram of a conversion module having a bridgeless PFC conversion unit of an embodiment of the present invention FIG. 6 are structure diagrams of three types of switch diode networks used in the bridgeless PFC conversion unit in an embodiment of the present invention FIG. 7 are the structure diagrams of four types of PFC inductor units used in an embodiment of the present invention

FIG. 5 is a diagram of the conversion module having a bridgeless PFC conversion unit in the embodiment of the present invention. As shown in the figure, the conversion module 1 comprises a bridgeless PFC conversion unit 11', a DC/DC conversion unit 13 and a bus capacitor 12, wherein the bridgeless PFC conversion unit 11' is composed of a PFC inductor 113' and a switch diode network 114'. As shown in FIG. 5, the rectifying bridge is absent in the topology of the bridgeless PFC conversion unit 11', if a filter structure is to be added, according to "safety of information technology equipment", the chosen capacitor should also be an X-capacitor, which also needs to be discharged after AC power is removed, and the X-capacitor used to filter differential mode signal is preferred with a greater capacitance. If a discharging resistor is utilized to discharge the X-capacitor, according to the requirement of discharge time constant (RC<1 second), a discharging resistor having relative low resistance is preferred, which results in large power consumption of the discharging resistor. Hence, how to raise the efficiency of the converter which comprises a bridgeless PFC conversion unit in the light load mode is facing serious pressure.

Figure 6:
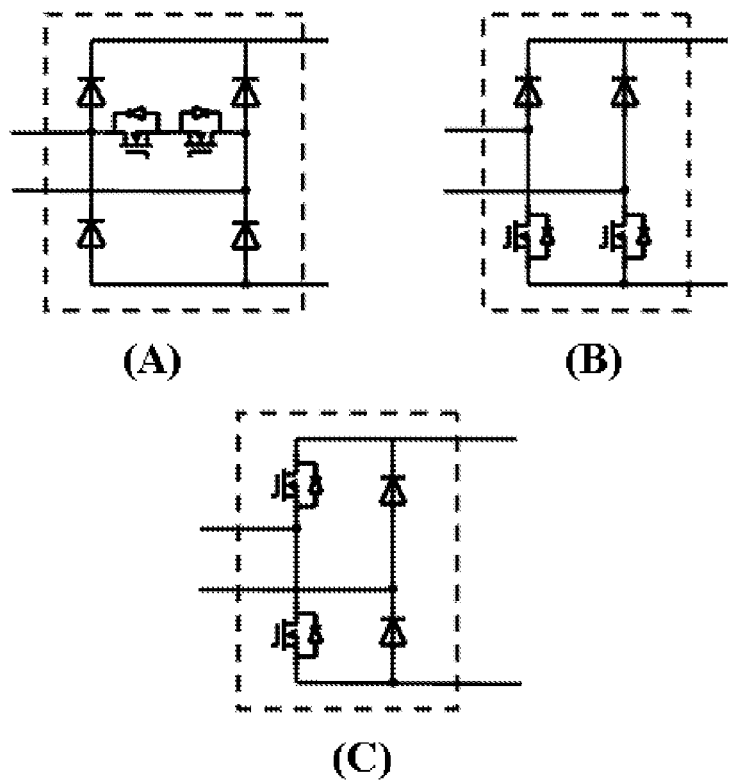

FIG. 6 is a structure diagram of three types of the switch diode network unit used in the bridgeless PFC conversion unit in the embodiments of the present invention. It should be noted that only three types of configurations of the switch diode network are shown in the figure, but other types of configuration could also be used in the embodiments of the present invention, furthermore, other derivative configurations in which the diode and switching transistor are interchangeable are also included in the scope of the present invention.

Figure 7:
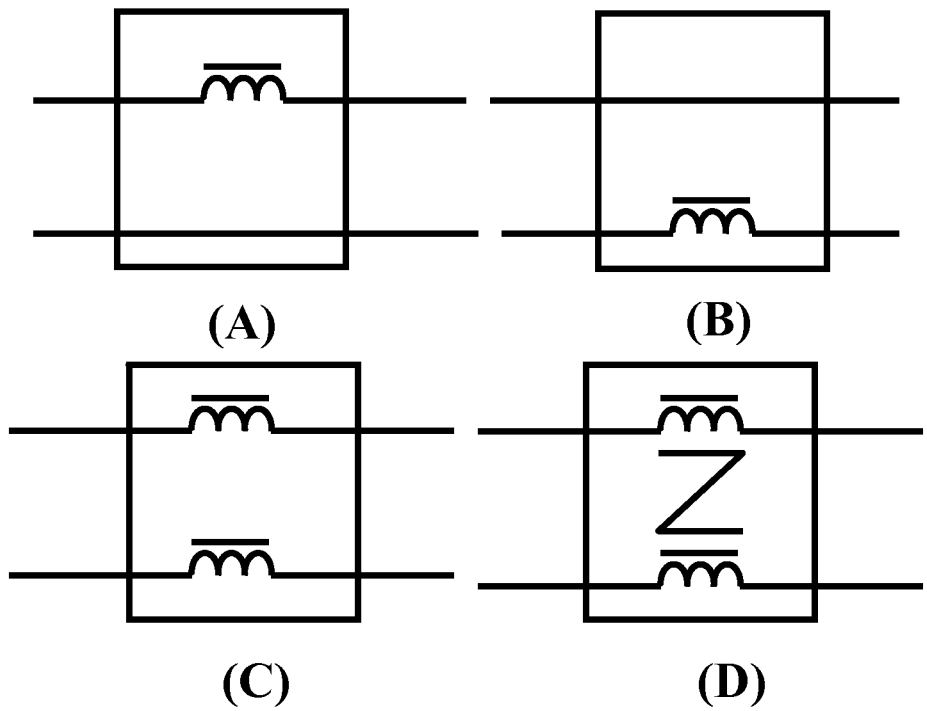

In the above two embodiments, the bridge PFC conversion unit 11 comprises the PFC inductor unit 113, and the bridgeless PFC conversion unit 11' comprises the PFC inductor unit 113'. Refer to FIG. 7, which is the structure diagrams of the four types of PFC inductor unit used in the embodiments of the present invention. Although only four kinds of configuration of the PFC inductor unit are shown in the figure, the PFC inductor unit can be composed of one or more inductors which are coupled to each other or not.

Figure 8:
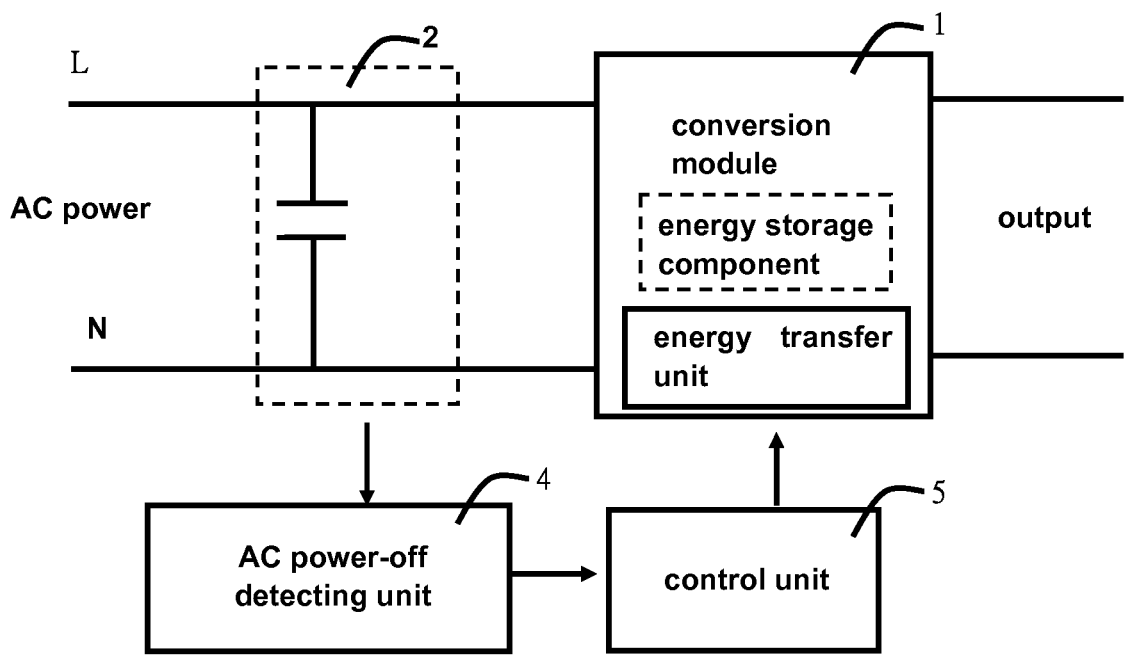
FIG. 8 is a circuit structure diagram of a converter with an energy transfer unit used to discharge the X-capacitor in the converter according to an embodiment of the present invention

FIG. 8 is a circuit structure diagram of one embodiment of the present invention in which an energy transfer unit is used to discharge the X-capacitor which the converter comprises. The converter in the embodiments of the present invention comprises an X-capacitor 2 connected between the L line and the N line of AC power input terminals, and a conversion module 1 coupled to the X-capacitor 2.

In the converter of the embodiments of the present invention, a discharging method is employed without using a discharging resistor. As shown in FIG. 8, the converter comprises the X-capacitor 2 connected between the L line and the N line of the AC power input terminals, the conversion module 1 coupled to the X-capacitor 2, the AC power-off detecting unit 4 used to detect on-off status of AC power and the control unit 5. The conversion module 1 at least includes an energy storage component and an energy transfer unit which comprises a switching device. The AC power-off detecting unit 4 is connected with the AC power input terminals and outputs an AC power-off signal which is received by the control unit 5. When the AC power-off detecting unit 4 detects that AC power is off, a signal is output to trigger the control unit 5 to send a switch driving signal, which controls operation of the energy transfer unit such that energy stored in the X-capacitor 2 is transferred to the energy storage component of the conversion module 1 to discharge the X-capacitor 2.

Figure 3:
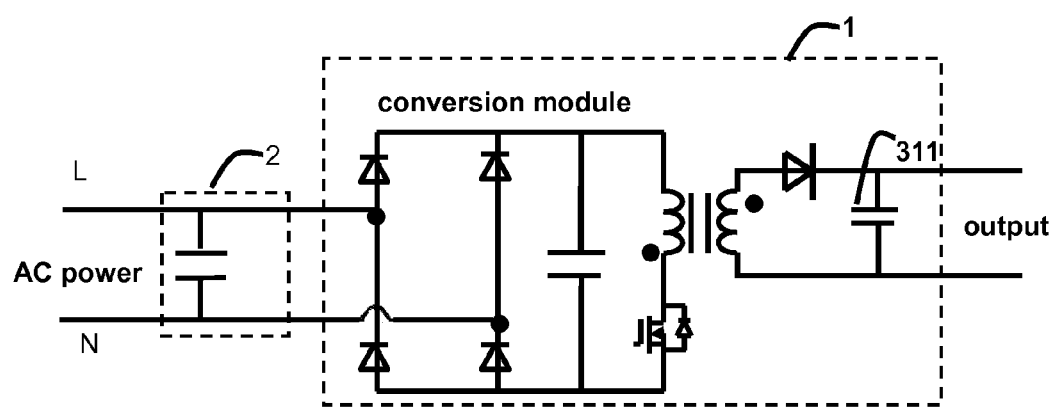
FIG. 3 is a circuit schematic diagram of a conversion module having a single-stage conversion unit of an embodiment of the present invention

As to the energy storage component mentioned above, it can be a capacitive component or an inductive component, for example, the energy storage component of the conversion module shown in FIG. 3 could be the capacitive element 311, and also could be an excitation inductance of the transformer; the energy storage component of the conversion module shown in FIG. 4 could be the capacitive element 12 and/or the capacitive element 131, and also could be the inductive element 113, wherein the capacitive element 131 is the output capacitor of the DC/DC conversion unit i.e. the output capacitor of the conversion module, and the inductive element 113 is the PFC inductor of the PFC conversion unit. In other embodiments, the inductive component, used as an energy storage component of the conversion module shown in FIG. 4, could also be the inductive component (not shown in the figure) in the DC/DC conversion unit. Besides, the energy storage component of the conversion module shown in FIG. 5 can be the capacitive component 12 and/or 131', wherein the capacitive component 131' is the output capacitor of the DC/DC conversion unit, i.e. the output capacitor of the conversion module; the energy storage component of the conversion module shown in FIG. 5 can also be the inductive component 113', which is the PFC inductor of the PFC conversion unit. In other embodiments, the inductive component, used as an energy storage component of the conversion module shown in FIG. 5, could also be the inductive element (not shown in the figure) of DC/DC conversion unit. That is to say, the energy storage component mentioned above can be any of components capable of storing energy. Taken for one example that the energy storage component is a capacitive component, after the AC power-off status is detected by the AC power-off detecting unit, the outputted AC power-off signal triggers the control unit to send the switch driving signal which controls the operation of the energy transfer unit to enhance the voltage of the capacitive component, so as to transfer the energy stored in the capacitor to the capacitive component of the conversion module and to discharge the capacitor.

Figure 9:
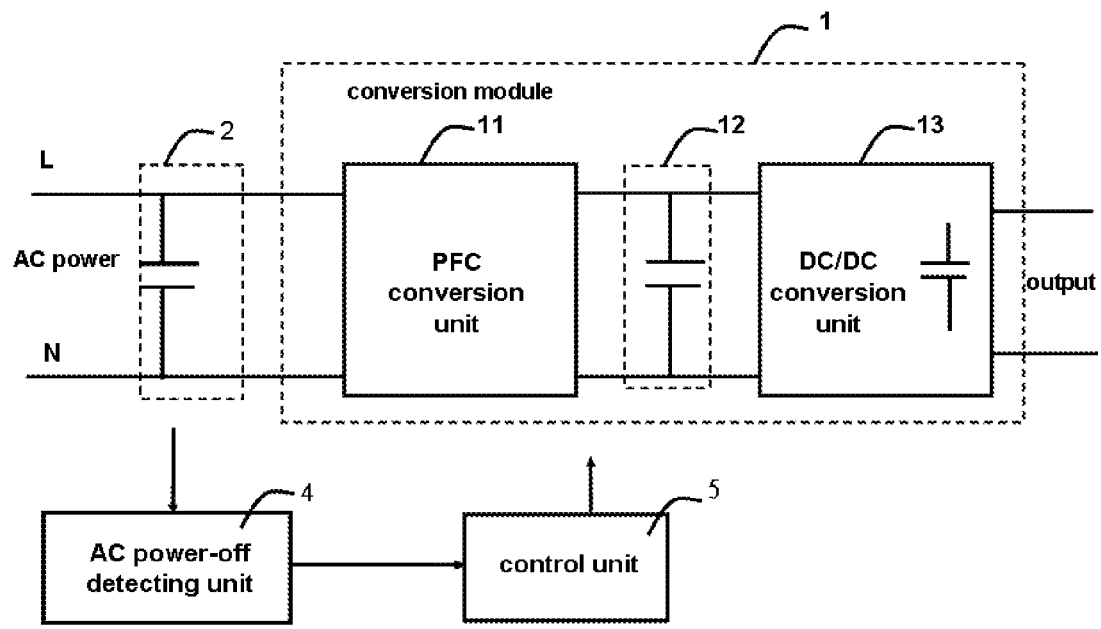
FIG. 9 is a circuit structure diagram of a converter with a two-stage conversion module and an X-capacitor which comprises an energy transfer unit used to discharge the X-capacitor according to an embodiment of the present invention
Figure 10:
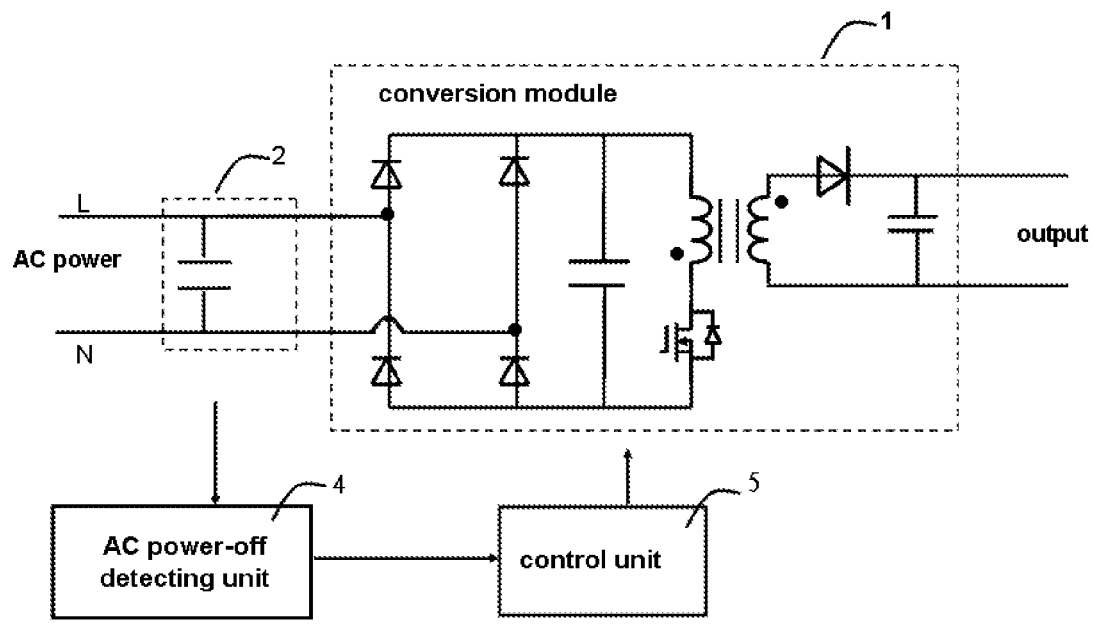
FIG. 10 is a circuit structure diagram of a converter with a single-stage conversion module and an X-capacitor which comprises an energy transfer unit used to discharge the X-capacitor according to an embodiment of the present invention

In an embodiment of the present invention, the energy transfer unit can be a part of the conversion unit in the original conversion module, which performs power conversion to achieve the original design function and feeds power to the output when AC power is inputted. And when AC power is off, the part is utilized as the energy transfer unit transferring energy stored in the X-capacitor to the energy storage component of the conversion module. As shown in FIG. 9, for the two-stage conversion module configuration, the energy transfer unit could be a PFC conversion unit of the conversion module 1 (the PFC conversion unit can be either the bridge PFC conversion unit in FIG. 4 or the bridgeless PFC conversion unit in FIG. 5), and also could be a combination of the PFC conversion unit and the DC/DC conversion unit in the conversion module 1. A single-stage conversion module is shown in FIG. 10. In this embodiment, the single-stage conversion module is a single-stage flyback conversion unit which also serves as an energy transfer unit. When AC power is introduced, the flyback conversion unit of the conversion module performs power conversion, and when AC power is off, the flyback conversion unit serves as the energy transfer unit, transferring the energy stored in the X-capacitor 2 to the energy storage component i.e. a capacitor of the conversion module 1. The single-stage flyback conversion unit is used by the embodiment to illustrate the present invention, but the scope of the present invention is not limited to the single-stage conversion unit.

In an embodiment of the present invention, the energy transfer unit also could be an auxiliary conversion unit in the conversion module 1, which comprises a switching device. When AC power is introduced, the auxiliary conversion unit in the conversion module 1 stops operation, with the output energy provided by the conversion unit of the original design. When AC power is off, the control unit 5 triggered by the AC power-off signal controls working of the auxiliary conversion unit in the conversion module 1 to transfer the energy stored in the X-capacitor 2 to the energy storage component of the conversion module 1, i.e. the auxiliary conversion unit serves as an energy transfer unit.

Figure 11:
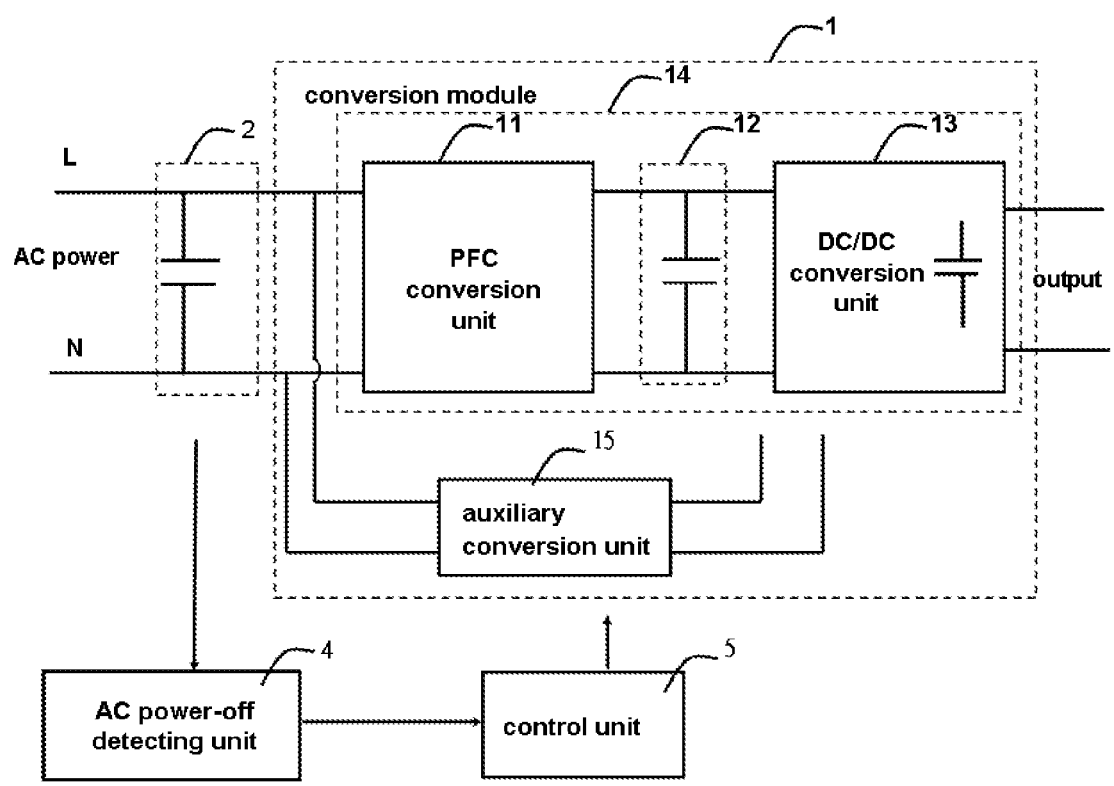
FIG. 11 is a circuit structure diagram of a converter having a two-stage conversion module and an X-capacitor which comprises an energy transfer unit used to discharge the X-capacitor according to an embodiment of the present invention
Figure 12:
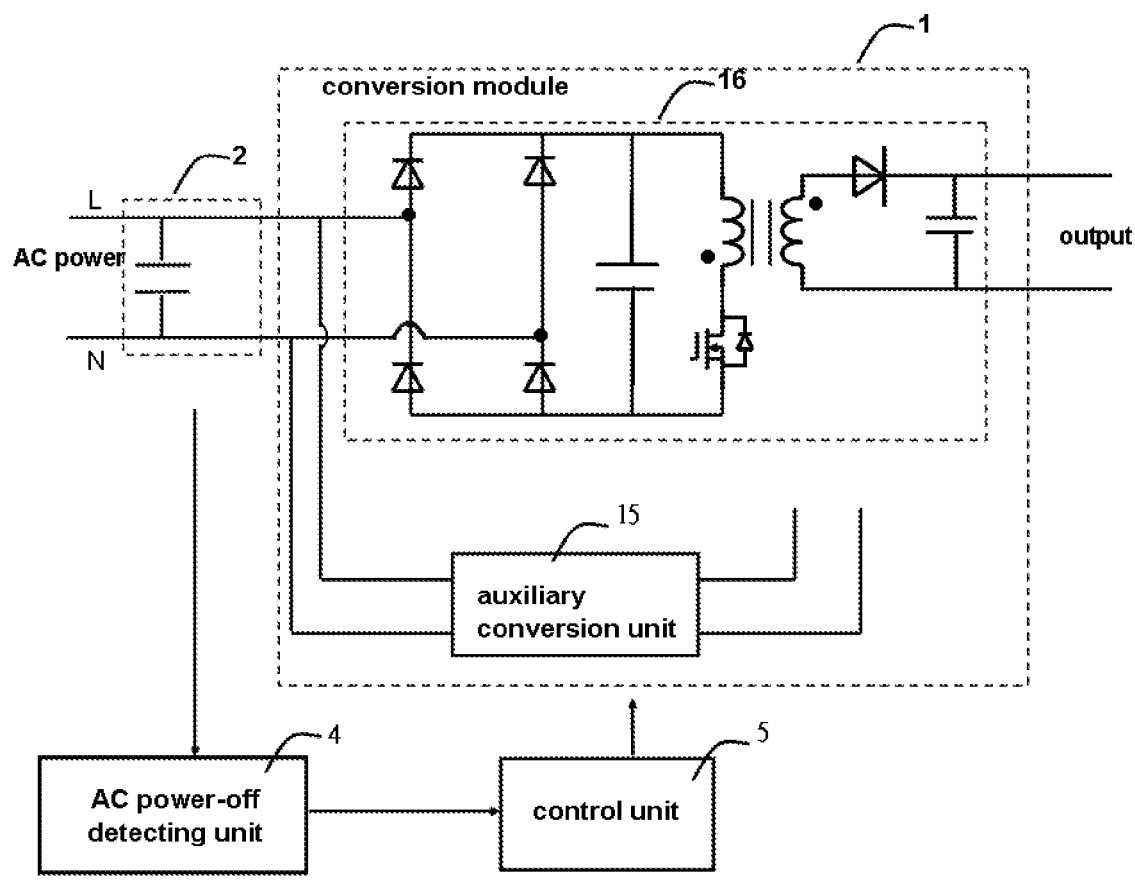
FIG. 12 is a circuit structure diagram of a converter having a single-stage conversion module and an X-capacitor which comprises an energy transfer unit used to discharge the X-capacitor according to an embodiment of the present invention

In an embodiment of the present invention, for the two-stage conversion module configuration, the auxiliary conversion unit 15, connected with the X-capacitor 2 and the energy storage component in the conversion module 1, can be used as the energy transfer unit, as shown in FIG. 11. When AC power is introduced, the PFC conversion unit 11 and DC/DC conversion unit 13 perform power conversion as original design, and the auxiliary conversion unit 15 stops working. When the AC power-off detecting unit 4 detects that AC power is off, the control unit 5 triggered by the AC power-off signal controls working of the auxiliary conversion unit 15 to transfer the energy stored in the X-capacitor 2 to the energy storage component of the conversion module 1, i.e. the auxiliary conversion unit 15 serves as the energy transfer unit. Wherein, the topology of the conversion unit 15 could be a boost conversion circuit, or a buck conversion circuit, or a buck-boost conversion circuit. As shown in FIG. 12, being a single-stage conversion module, the conversion module 1 is composed of a single-stage conversion sub-module 16 and an auxiliary conversion unit 15, which is connected with the X-capacitor 2 and the energy storage component in the single-stage conversion sub-module 16. When AC power is introduced, the conversion sub-module 16 of the conversion module 1 performs power conversion, and the auxiliary conversion unit 15 stops working. When the AC power-off detecting unit 4 detects that AC power is off, the control unit 5 triggered by AC power-off signal controls working of the auxiliary conversion unit 15 to transfer the energy stored in the X-capacitor 2 to the energy storage component, i.e. a capacitor of the conversion module 1 to discharge the X-capacitor 2, i.e. the auxiliary conversion unit 15 serves as the energy transfer unit.

The energy transfer unit stated above comprises a switching device which could be an Insulated Gate Bipolar Transistor (called IGBT for short) or a Metal Oxide Semiconductor Field Effect Transistor (called MOSFET for short), etc. The energy transfer unit could be any of functional units capable of transferring energy stored in the X-capacitor 2 to the energy storage component of the conversion module 1.

As can be seen from some embodiments stated above, the control unit 5 can be an individual part of the controller of the conversion module. That is to say, the control unit 5 stops working when AC power is introduced, and when AC power is off, it can control the operation of the energy transfer unit of the conversion module 1 to transfer the energy stored in the X-capacitor 2 to the energy storage component of the conversion module 1. It should be noted that the control unit 5 can be any of control circuits in the prior art that can control the operation of the energy transfer unit of the conversion module 1 to transfer the energy stored in the X-capacitor 2 to the energy storage component of the conversion module 1, and it will not go into the details here. In other embodiments of the present invention, a part of the control unit of the original power conversion unit (such as the two-stage power conversion unit 14 shown in FIG. 11 and the single-stage power conversion unit 16 shown in FIG. 12) in the conversion module 1 can serves as part circuit of the control unit 5. When AC power is off, the AC power-off signal triggers working of the control unit 5, which controls the operation of the energy transfer unit in the conversion module 1 to discharge the X-capacitor 2.

In an embodiment of the present invention, the AC power-off detecting unit 4 judges on or off state of AC power by detecting the voltage across the two terminals of the X-capacitor 2, but it is not limited to this. That is to say, in embodiments of the present invention, the AC power-off detecting unit 4 can operate in any of working mode capable of judging on-off status of AC power.

Figure 13:
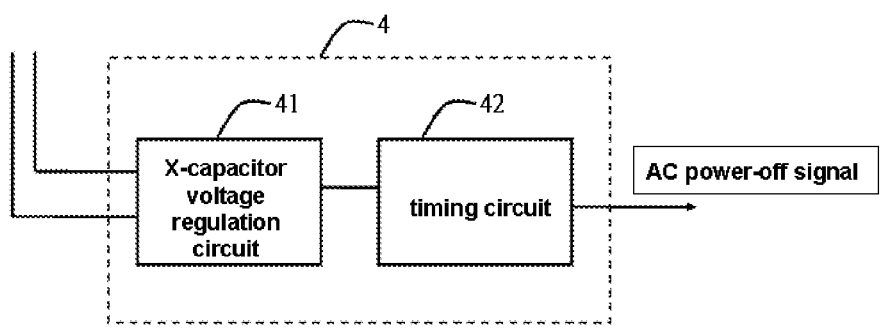
FIG. 13 is a structure diagram of an AC power-off detecting unit in embodiments of the present invention

FIG. 13 is a structure diagram of the AC power-off detecting unit in embodiments of the present invention. In some embodiments, the AC power-off detecting unit 4 may comprise a capacitor voltage regulation circuit and a timing circuit. An embodiment of the present invention will be stated by an example that the AC power-off detecting unit 4 comprises an X-capacitor voltage regulation circuit and a timing circuit. As shown in the figure, the X-capacitor voltage regulation circuit 41 of the AC power-off detecting unit 4 converts the voltage across the two terminals of the X-capacitor 2 to match the following circuit, i.e. it transforms the voltage across the two terminals of the X-capacitor 2 into another output voltage signal which can reflect the AC characteristic of the input power. The timing circuit 42 receives the output voltage signal generated by the X-capacitor voltage regulation circuit 41 and judges its AC characteristic, that is to say, both time period of the positive voltage and that of the negative voltage of the X-capacitor voltage are calculated and judged respectively. If the time of the positive voltage or that of the negative voltage doesn't exceed a predetermined time (e.g. the predetermined time is the period of AC power), then it is judged that AC power is introduced properly; if the time of the positive voltage or that of the negative voltage exceeds the predetermined time, it is judged that AC alteration is absent on the power at the moment, i.e. AC power is off. As to the outer form of the circuit, the signal indicating on-off status of AC power is generated, by judging whether the DC voltage outputting from the timing circuit 42 exceeds the given second threshold voltage value Vth2 or not, and then outputted. Particularly, the timing circuit 42 may judge that whether the DC voltage signal exceeds the given second threshold voltage value Vth2 or not by the capacitor charging and discharging voltage of RC (resistors and capacitors) circuit. If the capacitor charging and discharging voltage exceeds the given second threshold voltage Vth2, the AC power-off detecting unit 4 will generate an AC power-off signal indicating the disconnection of AC power, or else, the AC power-off detecting unit 4 will judge that AC power is still on.

In some other embodiments, the AC power-off detecting unit 4 can also be embodied as some digital circuits with the similar principle as that of the above analog circuits, and it won't go into the details here. Next, the working principle of the AC power-off detecting unit 4 will be stated in detail by one embodiment.

Figure 14:
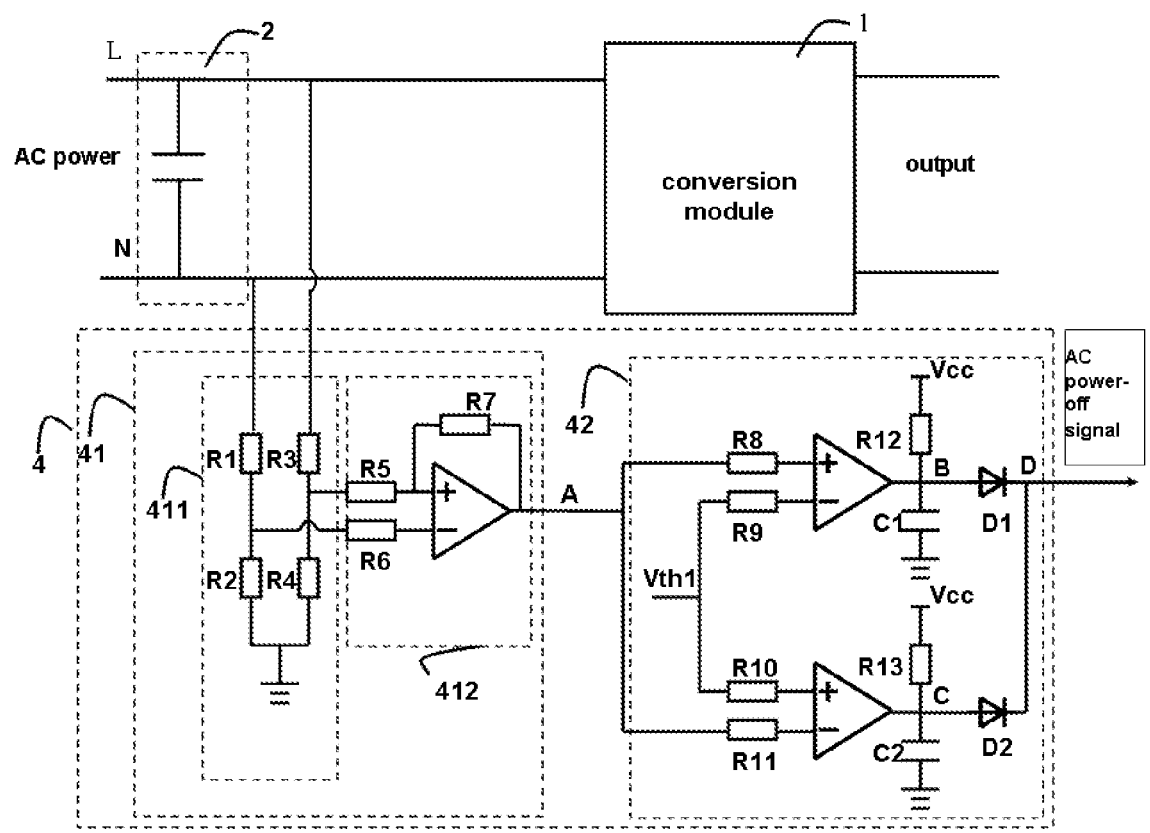
FIG. 14 shows a detailed embodiment of the AC power-off detecting unit of the present invention

FIG. 14 shows a detailed embodiment of the AC power-off detecting unit of the present invention. As shown in the figure, the AC power-off detecting unit 4 comprises an X-capacitor voltage regulation circuit 41 and a timing circuit 42, wherein the X-capacitor voltage regulation circuit 41 comprises a voltage divider network 411 and a comparator 412, and the timing circuit 42 is a timing integration circuit. First, the sampled X-capacitor voltage is regulated by the comparator 412 of the X-capacitor voltage regulation circuit 41, then the timing circuit 42 carries out the process of timing integration for the signal outputted from the X-capacitor voltage regulation circuit 41 to get the output signal of the AC power-off detecting unit 4, i.e. the AC power-off signal. If the X-capacitor voltage signal is alternating, the capacitor in the timing circuit will be charged and discharged periodically, leading to that the outputted AC power-off signal is lower than a given voltage value; otherwise, if the X-capacitor voltage signal is constant, the output of the timing circuit will be higher than the given voltage value. Therefore, when AC power is introduced, the output voltage of the AC power-off detecting unit 4 is lower than the given second threshold voltage Vth2, and when AC power is off, the output voltage of the AC power-off detecting unit 4 is higher than the given second threshold voltage value Vth2, which indicates disconnection of AC power. As shown in FIG. 14, the voltage divider network of the X-capacitor voltage regulation circuit 41, that is used to sample voltage of the X-capacitor, includes a first resistor R1, a second resistor R2, a third resistor R3 and a fourth resistor R4, wherein the resistor R1 and the resistor R2 are connected in series to form a first branch, the resistor R3 and the resistor R4 are connected in series to form a second branch. One end of the first branch is connected to the N line of AC power, one end of the second branch is connected to the L line of AC power, the other end of the first branch and that of the second branch are both connected to ground. The comparator 412 of the X-capacitor voltage regulation circuit 41 comprises a first comparator which has a non inverting input terminal, an inverting input terminal and an output terminal. The common node of the resistor R1 and the resistor R2 is connected to the inverting input terminal of the first comparator via the sixth resistor R6, and the common node of the resistor R3 and the resistor R4 is connected to the non inverting input terminal of the first comparator via the fifth resistor R5. Point A, the output terminal of the first comparator, is the output terminal of the X-capacitor voltage regulation circuit 41. The timing circuit 42 comprises a second comparator, a third comparator, a first charging circuit, a second charging circuit, a first diode D1 and a second diode D2. Point A, the output terminal of the X-capacitor voltage regulation circuit 41 is connected to the non inverting input terminal of the second comparator and the inverting input terminal of the third comparator via an eighth resistor R8 and an eleventh resistor R11 respectively. The first threshold voltage Vth1 is put on the inverting input terminal of the second comparator and the non inverting input terminal of the third comparator via a ninth resistor R9 and a tenth resistor R10 respectively. The first charging circuit comprises a series circuit composed of a first capacitor C1 and a twelfth resistor R12, one end of the series circuit is connected to a DC voltage source Vcc, the other end of the series circuit is connected to ground. The common node of the capacitor C1 and the resistor R12 is connected to point B, the output terminal of the second comparator. The second charging circuit comprises a series circuit composed of the second capacitor C2 and the thirteenth resistor R13, one end of the series circuit is connected to the DC voltage source Vcc, the other end of the series circuit is connected to ground. The common node of the capacitor C2 and the resistor R13 is connected to point C, the output terminal of the third comparator. The anodes of the first diode D1 and the second diode D2 are respectively connected to point B, the output terminal of the second comparator, and point C, the output terminal of the third comparator. The cathodes of the diode D1 and the diode D2 are connected directly to form the output terminal of the timing circuit, i.e. the output terminal of the AC power-off detecting unit 4 that outputs an AC power-off signal.

Figure 15:
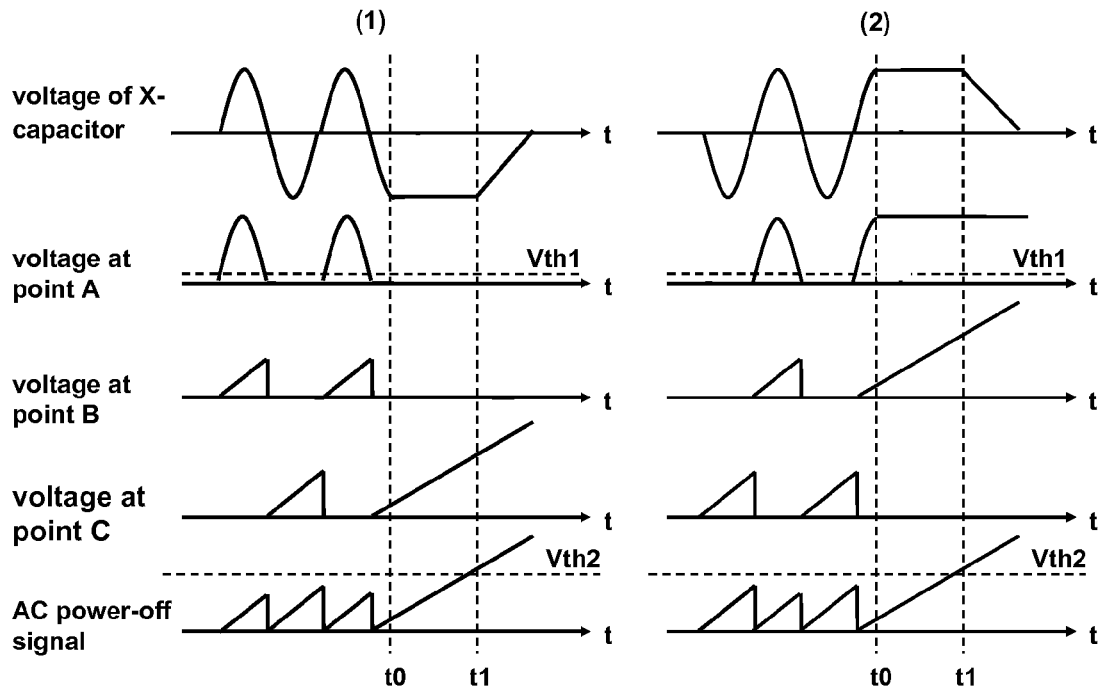
FIG. 15 shows waveforms of the AC power-off detecting unit in FIG. 14

Refer to FIG. 15, which is the waveform of the embodiment of the AC power-off detecting unit in FIG. 14. FIGS. 15.(1) and 15.(2) respectively illustrate the cases that AC power is off during its negative period and during its positive period. As can be seen from the figures, the voltage waveform of the output terminal A of the X-capacitor voltage regulation circuit can reflect the AC characteristic of AC power.

Now, refer to FIG. 15.(1), details will be stated by the example that the input voltage of AC power is disconnected when the voltage being negative. Before time t0 AC power is introduced normally, the voltage of X-capacitor is a sinusoidal wave, divided by the series circuit which is composed of the first resistor R1 and the second resistor R2, also divided by the series circuit composed of the third resistor R3 and the fourth resistor R4, as well as passing by the first comparator, and the voltage at point A has a waveform of a half wave rectified sine. That waveform can reflect the AC alteration of X-capacitor. The waveform is compared with the first threshold voltage Vth1 by the second comparator and the third comparator respectively, such that the first capacitor and the second capacitor of the first charging circuit and the second charging circuit is periodically charged and discharged by the DC voltage source Vcc. For instance, when the voltage of X-capacitor is positive and the voltage at point A is higher than the given threshold voltage Vth1, the first capacitor C1 is charged and the second capacitor C2 is discharged. But because of the periodic AC alteration of the X-capacitor's voltage, the voltage value of the first capacitor C1 or that of the second capacitor C2 doesn't exceed the second threshold voltage Vth2 when the capacitor C1 or the capacitor C2 is being charged. And the AC power-off signal generated by the AC power-off detecting unit 4 won't trigger the control unit 5, therefore, the conversion module 1 carries on power conversion as original design to feed power to the output. At the time to, the AC power is disconnected, the voltage of the X-capacitor 2 remains constant, the voltage at point A remains at low level, the capacitor C2 is continuously charged, the capacitor C1 is discharged to zero i.e. the voltage at point B is zero, and the output voltage signal of the AC power-off detecting unit 4 is the voltage signal at point C. At the time t1, the voltage of the capacitor C2 exceeds the given second threshold voltage Vth2, that is to say, the output voltage of the AC power-off detecting unit 4 is higher than the given voltage value such that the disconnection of AC power is detected. At this time, the AC power-off signal outputted from the AC power-off detecting unit 4 triggers the control unit 5 to output a switch driving signal which controls the operation of the energy transfer unit of conversion module 1 to transfer energy stored in the X-capacitor 2 to the energy storage component of the conversion module 1.

In this embodiment, the first threshold voltage Vth1, the second threshold voltage Vth2 and the DC voltage source Vcc can be determined on the basis of design requirements, and the above voltage values can be derived from the internal circuit of the power converter or other circuits.

FIG. 15.(2) shows voltage waveforms of X-capacitor, point A, point B and point C, as well as waveform of the AC power-off signal when AC power is off during its positive period. The operation principle is the same as that in FIG. 15.(1) and won't be described here.

In this embodiment, it is judged that whether the capacitor voltage of the RC circuit in the timing circuit 42 exceeds the given second threshold voltage Vth2 or not. If the capacitor voltage exceeds the given second threshold voltage Vth2, it is considered that AC power is off, or else, it is considered that AC power is still on. In some other embodiments, it can be detected by other circuits that whether AC power is off or not. Here, the function of the AC power-off detecting unit 4 can be realized by analog circuits, and in some other embodiments, it could be realized by digital circuits.

Figure 16:
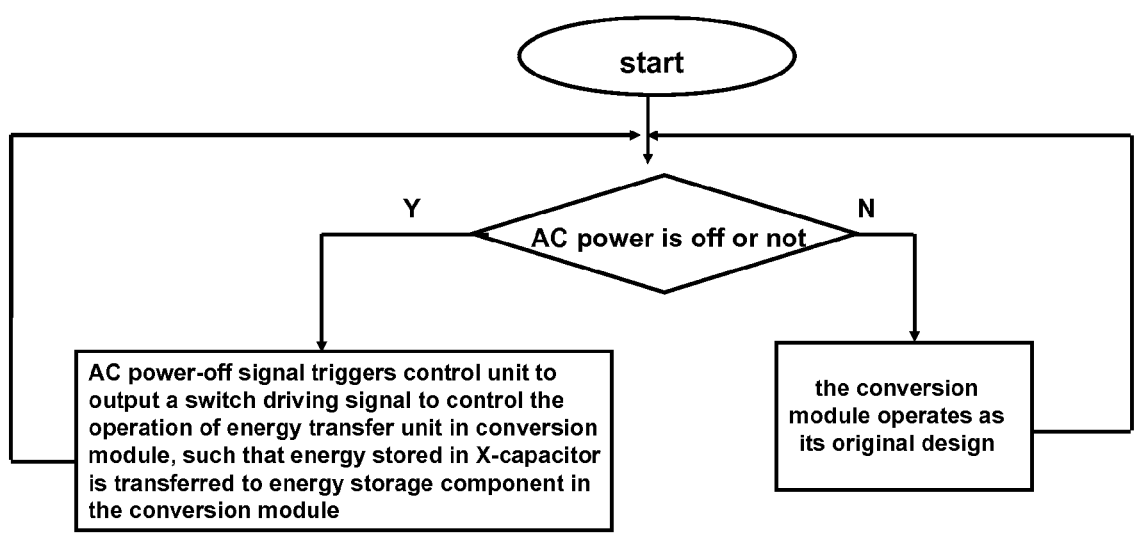
FIG. 16 is a flow diagram of operation of the energy transfer unit controlled by the AC power-off signal via the control unit

FIG. 16 shows a flow that operation of the energy transfer unit is controlled by the AC power-off signal via the control unit in an embodiment of the present invention. When AC power is on, the conversion module 1 operates normally as the original design to feed power to the output (i.e. the function of power conversion is realized), with the control unit of the original conversion unit not affected by the AC power-off signal. When AC power is off, the AC power-off signal outputted from the AC power-off detecting unit 4 triggers the control unit 5 to output a switch driving signal to control the operation of the energy transfer unit in the conversion module 1, to transfer energy stored in the X-capacitor 2 to the energy storage component of the conversion module 1 and to discharge the capacitor 2. In an embodiment of the present invention, the operation of the energy transfer unit is controlled by increasing the duty cycle of the switch driving signal, that is to say, more energy will be transferred by the energy transfer unit in a predetermined time (e.g. the specified discharge time constant), compared to the case that the conversion module operates as the original design, such that energy stored in the X-capacitor 2 is transferred to the energy storage component of the conversion module 1 and the X-capacitor 2 is discharged. In an embodiment of the present invention, the duty cycle of the switch driving signal is enhanced by increasing pulse width of the switch driving signal or regulating switching frequency of it.

Next, the working principle of the control unit 5 will be briefly described by an example that part of the control units of the original conversion unit (e.g. the two-stage power conversion unit 14 in FIG. 11 and the single-stage power conversion unit 16 in FIG. 12) in the conversion module work as part of the circuits of the control unit 5.

In some embodiments of the present invention, the control unit 5 includes an intervention unit 51 in addition to a feedback regulation unit 52 and a switch signal generation unit 53. The feedback regulation unit 52 receives a feedback signal and generates an output signal, according to which the switch signal generation unit generates a switch driving signal. It should be noted that the feedback regulation unit 52 and the switch signal generation unit 53 in the control unit 5 can make use of the circuits which have the same function in the original power conversion unit (e.g. two-stage power conversion unit 14 in FIG. 11 and single-stage power conversion unit 16 in FIG. 12) of the conversion module 1. That is to say, in embodiments of the present invention, in order to simplify the whole circuits, the feedback regulation unit 52 and the switch signal generation unit 53 in the control unit 5 can make use of part of circuits of the control circuit in the PFC conversion unit or in the DC/DC conversion unit or in the single-stage power conversion unit. In other embodiments of the present invention, the feedback regulation unit 52 and the switch signal generation unit 53 in the control unit 5 could also be additional circuits, without using the circuit of the control unit in the original power conversion unit of the conversion module.

In embodiments of the present invention, the intervention unit in the control unit 5 can operate in various manners, as long as the switch driving signal outputted from the control unit 5 can control the operation of the switching device of the energy transfer unit in the conversion module 1 to transfer energy stored in the X-capacitor 2 to the capacitive element in the conversion module 1 and to discharge the X-capacitor 2.

Figure 17:
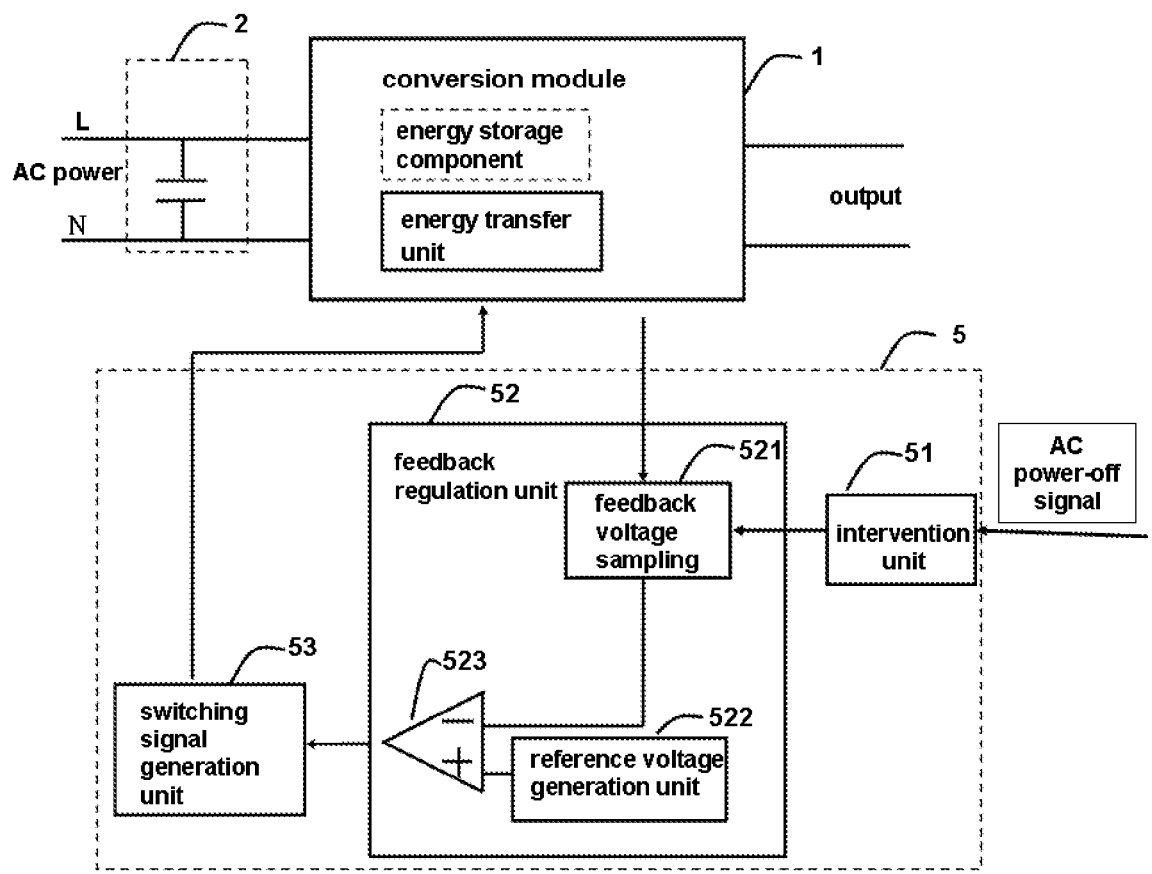
FIG. 17 is a circuit block diagram of the control unit including an intervention unit in an embodiment of the present invention

FIG. 17 is a circuit block diagram of the control unit including an intervention unit in an embodiment of the present invention. Specifically, as shown in FIG. 17, the control unit 5 comprises an intervention unit 51, a feedback regulation unit 52 and a switch signal generation unit 53, wherein, the feedback regulation unit 52 comprises a feedback voltage sampling unit 521, a reference voltage generation unit 522 and a regulation unit 523. In other embodiments, the regulation unit 523 is a PID (proportion integration differentiation) unit. In this embodiment, when disconnection of AC power is detected by the AC power-off detecting unit 4, the AC power-off signal from the AC power-off detecting unit will trigger the intervention unit 51 to intervene the feedback voltage sampling unit 521 of the feedback regulation unit 52, such that the switch driving signal outputted from the switch signal generation unit 53 drives the operation of switching device of the energy transfer unit in the conversion module 1 to discharge the X-capacitor 2. When AC power is introduced, the intervention unit 51 has no effect on the output of the feedback voltage sampling unit 521 in the feedback regulation unit 52, and the conversion module 1 operates as the original design.

Figure 18:
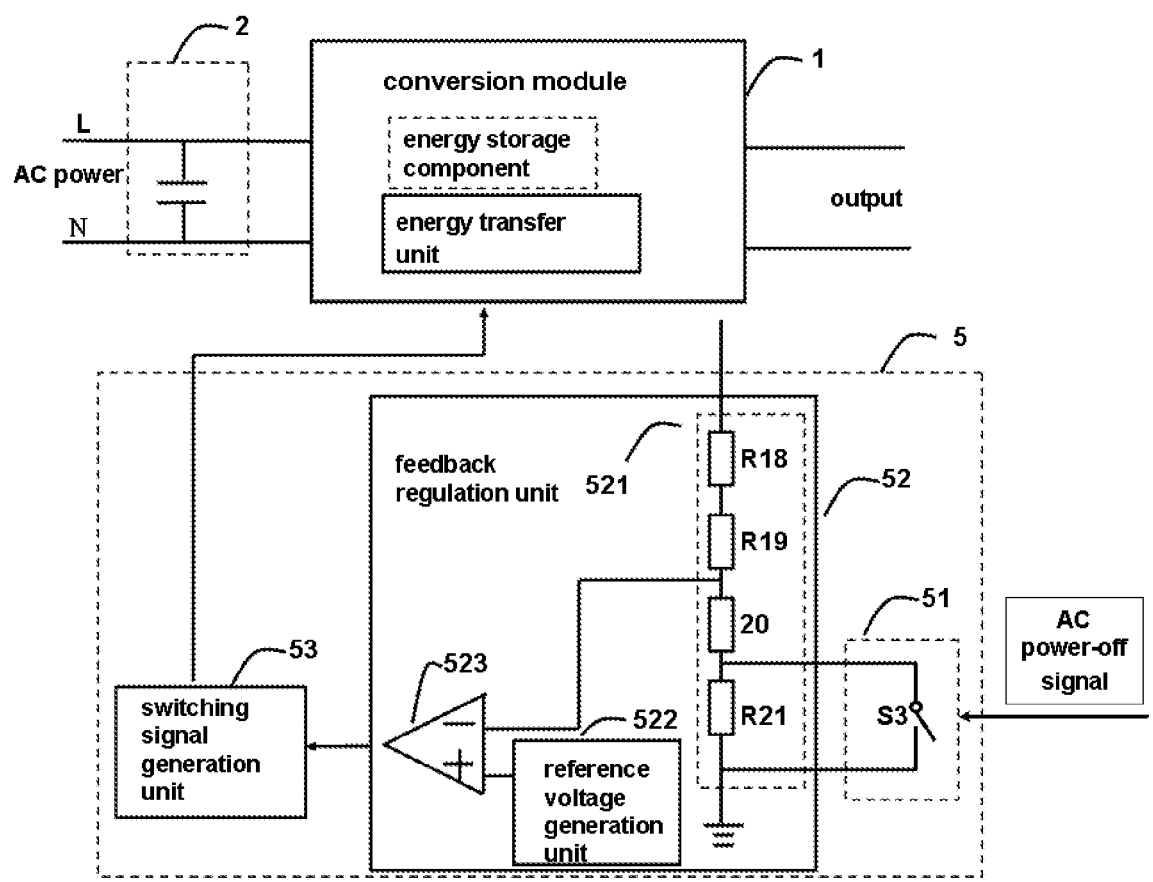
FIG. 18 is a specific circuit diagram of the control unit including the intervention unit of FIG. 17

FIG. 18 shows a specific circuit diagram of the control unit comprising an intervention unit in FIG. 17. In this embodiment, the energy storage component receiving the energy of the X-capacitor 2 is a capacitive component, which could be a bus capacitor. As shown in the figure, the feedback regulation unit 52 has a typical connection configuration: one end of the capacitive component in the conversion module which receives the energy of X-capacitor is connected to ground via the resistors R18, R19, R20 and R21, which are successively connected in series in the feedback voltage sampling unit 521 of the feedback regulation unit 52, and the common node of the resistor R19 and R20 is connected to the inverting input terminal of the regulation unit 523, with the non inverting input terminal connected to the reference voltage generation unit 522. The regulation unit 523 generates an output signal on the basis of the sampling voltage of the capacitive component which receives the energy of X-capacitor and the reference voltage obtained from the reference voltage generation unit, by which the switch signal generation unit 53 generates a switch driving signal to drive the operation of the switching device in the conversion module 1. In the embodiment, different from the typical, the intervention unit 51 is connected in parallel with the resistor R21, and receives an AC power-off signal outputted from the AC power-off detecting unit 4. In the embodiment of the present invention, the intervention unit 51 is a switching device which is shown as a switch transistor S3 in the figure, and controlled by the AC power-off signal. When disconnection of AC power is detected by the AC power-off detecting unit 4, the switch transistor is turned on and the resistor R21 is short-circuited, and the voltage inputted to the inverting input terminal of the regulation unit 523 decreases, such that the original feedback network is changed.

Specifically, in the case that the conversion module 1 operates normally, i.e. the intervention unit 51 is not triggered by the AC power-off signal, the conversion module 1 is controlled by the original feedback network, with the value of the feedback voltage being:

$$V_{FB} = V_C * \frac{R20 + R21}{R18 + R19 + R20 + R21}$$

Vc in this formula represents the voltage value of the capacitive component receiving energy stored in the X-capacitor 2.

$V_{FB}$ represents the value of the feedback voltage outputted from the feedback voltage sampling unit.

At this time, the conversion module 1 is controlled on the basis of the feedback voltage $V_{FB}$ to generate a switch driving signal to drive the operation of the switch transistor in the conversion module 1. On the other hand, when AC power is off, the switch transistor S3 is on and the resistor R21 is short-circuited under the control of the AC power-off signal. So the original feedback network is changed, with the value of the feedback voltage at this time being:

$$V_{FB}^* = V_C * \frac{R20}{R18 + R19 + R20}$$

That is to say, $V^*_{FB} < V_{FB}$, at this time, the voltage of the inverting input terminal of the regulation unit 523 decreases and the output voltage increases, such that the control unit 5 outputs a switch driving signal to control the operation of the switching device in the energy transfer unit of the conversion module 1, so as to enhance the voltage value of the capacitor receiving the energy stored in X-capacitor 2, and to transfer energy from the X-capacitor 2 to the energy storage component in the conversion module 1.

Figure 19:
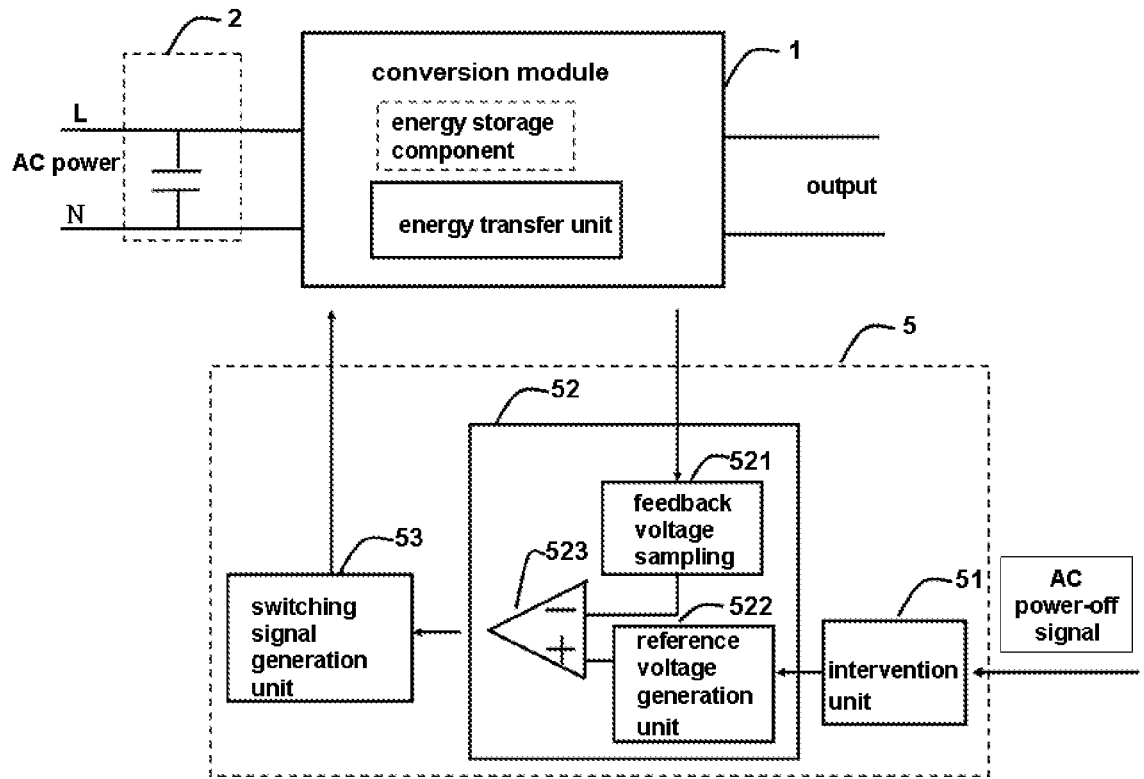
FIG. 19 is a circuit diagram of the control unit including an intervention unit in an embodiment of the present invention

In the embodiment of the present invention, the intervention unit 51 can affect the feedback regulation unit 52 in various manners. In one embodiment (as shown in FIG. 18) of the present invention, the sampling voltage value of the feedback voltage sampling unit 521 is decreased by intervening the feedback voltage sampling unit 521, so that the output voltage of the regulation unit 523 increases and the switching device in the energy transfer unit of the conversion module 1 is controlled to raise the voltage value of the capacitive component receiving the energy stored in the X-capacitor 2, and to transfer energy from the X-capacitor 2 to the capacitive component in the conversion module 1. In another embodiment of the present invention, the reference voltage is increased by intervening the reference voltage generation unit 522, so that the output voltage of the regulation unit 523 increases and the switching device in the energy transfer unit of the conversion module 1 is controlled to transfer energy from the X-capacitor 2 to the capacitive component in the conversion module 1. Refer to FIG. 19, which is a circuit diagram of the control unit comprising an intervention unit in an embodiment of the present invention. As shown in FIG. 19, the intervention unit 51 intervenes the reference voltage generation unit 522, which results in an increase of the output voltage of the regulation unit 523, to control the operation of the switching device in the energy transfer unit of the conversion module 1, which aims to enhance the voltage value of the capacitive component receiving the energy stored in the X-capacitor 2, and to transfer energy from the X-capacitor 2 to the capacitive component in the conversion module 1.

Figure 20:
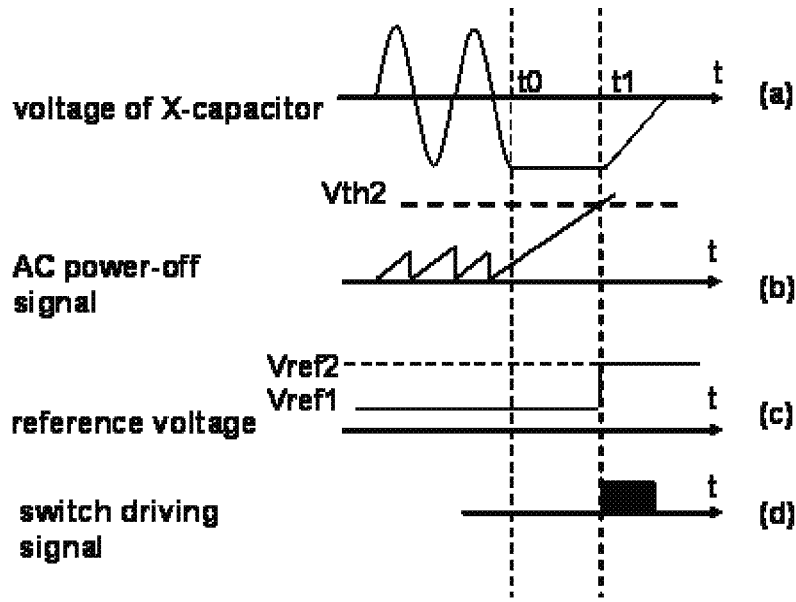
FIG. 20 shows waveforms in the process of capacitor discharge controlled by the control unit in FIG. 19

Next, the principle of the X-capacitor 2 being discharged when AC power is off will be discussed by the waveforms of this embodiment. As shown in FIG. 20, FIG. 20a shows the voltage of the X-capacitor 2. Before time t0, the voltage of X-capacitor 2 is a sine wave due to the introduction of AC power, and the AC power-off signal (shown in FIG. 20b) is lower than the given threshold voltage value Vth2 because the capacitor is periodically charged and discharged, and the reference voltage (shown in FIG. 20c) is a reference value Vref1 under normal operation being set when AC power is introduced. At time t0, when AC power is disconnected, the voltage of X-capacitor 2 maintains at an instantaneous value and the AC power-off signal increases continuously. At time t1, disconnection of AC power is detected because that the value of AC power-off signal exceeds the given threshold voltage Vth2. The reference voltage generation unit 522 is affected by the intervention unit 51 to make the reference voltage increase from Vref1 to Vref2, which results in an increase in output of the feedback regulation unit 523, so that the switch driving signal (shown as FIG. 20d) outputted from the control unit 5 drives the operation of the switching device in the energy transfer unit of the conversion module 1 to discharge the X-capacitor 2.

Figure 21:
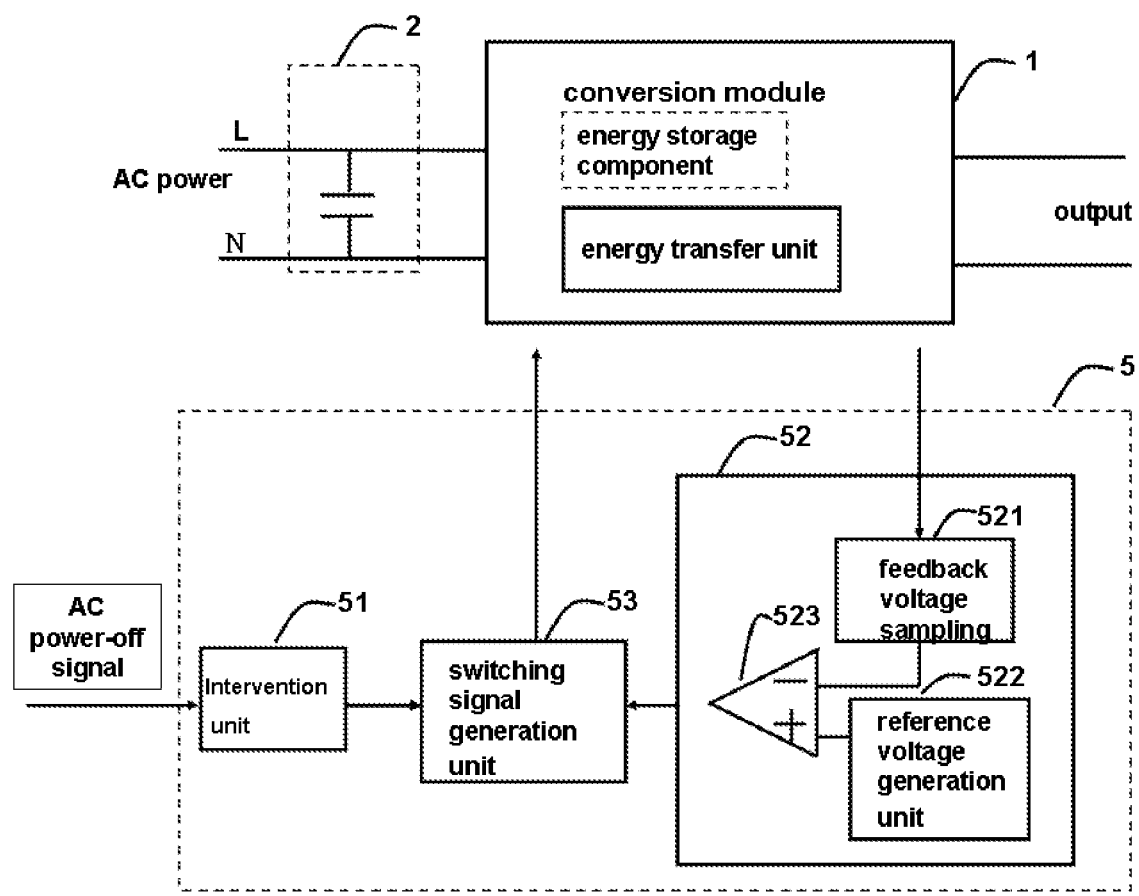
FIG. 21 is a circuit structure diagram of the control unit including an intervention unit of an embodiment of the present invention

FIG. 21 is a circuit structure diagram of the control unit comprising an intervention unit in an embodiment of the present invention. In this embodiment, the intervention unit 51 directly affects the switching signal generation unit 53 of the control unit 5, so that the switching device in the energy transfer unit of the conversion module 1 is driven to work by the switch driving signal outputted from the control unit 5 to discharge the X-capacitor 2.

Figure 22:
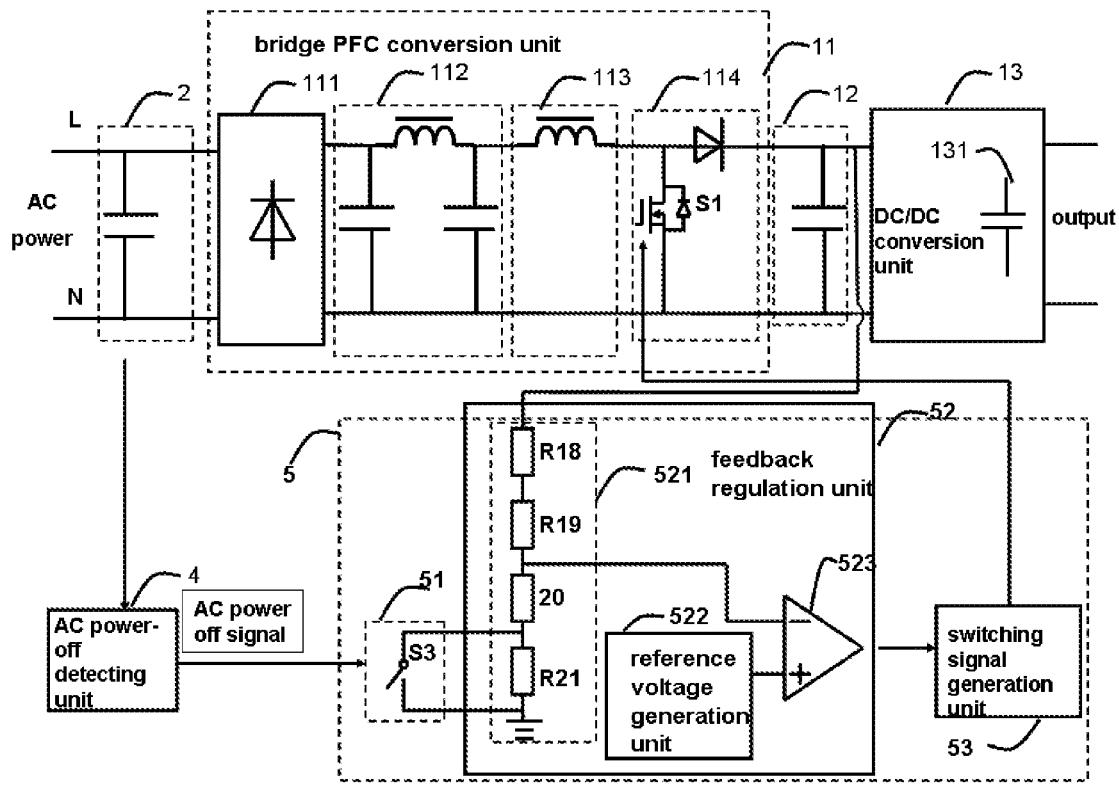
FIG. 22 is a specific circuit schematic diagram of an embodiment that a bridge PFC conversion unit is used as the energy transfer unit to discharge the X-capacitor in the converter
Figure 23:
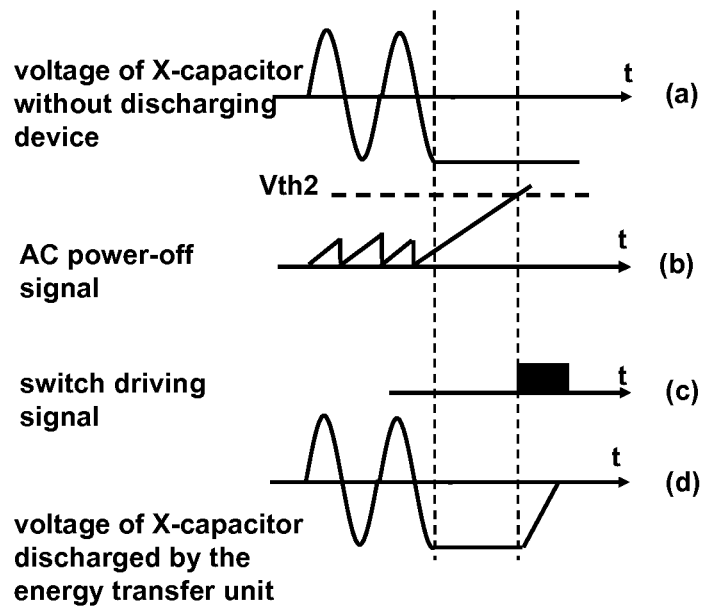
FIG. 23 shows waveforms of the process in which the capacitor is discharged by the converter having the X-capacitor in FIG. 22.

FIG. 22 is a specific circuit schematic diagram according to an embodiment of the present invention in which the bridge PFC conversion unit is used as an energy transfer unit to discharge the X-capacitor in the converter. Next, details will be described by an example that the converter is the one shown in FIG. 4 and the control circuit 5 is the one shown in FIG. 18. As shown in FIG. 22, the bridge PFC conversion unit 11 of the converter is utilized as an energy transfer unit, the energy storage component of the conversion module 1 is a bus capacitor 12, the feedback voltage sampling unit 521 samples the voltage of output capacitor $C_{bus}$ of the PFC conversion unit 11, and the on-off status of the switching device S1 of the switch diode network in the PFC conversion unit 11 is controlled by the switch driving signal which is outputted from the switch signal generation unit 53. FIG. 23 shows the voltage waveforms of the X-capacitor in an embodiment that the energy transfer unit is used to discharge the X-capacitor in the converter. FIG. 23(a) shows the voltage waveform of the X-capacitor when the X-capacitor discharging device is absent, FIGS. 23(b) and 23(c) shows the waveform of the AC power-off signal and the switch driving signal respectively, and FIG. 23(d) shows the voltage waveform of the X-capacitor which is discharged by an energy transfer unit. Before time t0, AC power is fed to the converter normally, and no disconnection of AC power is detected, so the AC power-off signal outputted from the AC power-off detecting unit will not turn on the switching device S3 in the intervention unit 51, i.e. the conversion module in the converter operates as the original design. At the time t0, AC power is disconnected (illustrated by an example that AC power is off during its negative period), if the X-capacitor 2 is not discharged, the voltage across the two terminals of the X-capacitor 2 will maintain at an instantaneous voltage level which can't be released, that is to say, there is a high voltage all the time which endangers user safety. In the embodiment of the present invention, AC power is off at time t0, and the disconnection of AC power is detected by the AC power-off detecting unit after a time interval of t1-t0. That is to say, the AC power-off signal generated at the time t1 turns on the switching device S3 of the intervention unit 51, which short-circuits the resistor R21 in the feedback voltage sampling unit, and the feedback voltage input to the inverting input terminal of the regulation unit decreases, so that the original feedback network is changed. The control unit 5 outputs a control signal shown in FIG. 23(c) according to the current feedback voltage, which makes the switching device S1 of the PFC conversion unit 11 work to enhance the voltage value across the capacitor $C_{bus}$ and transfers energy from the X-capacitor 2 to the capacitive element ($C_{bus}$ capacitor 12) by the energy transfer unit (i.e. PFC conversion unit of this embodiment).

As stated previously, the characteristic of the present invention is that the X-capacitor is discharged by an energy transfer unit, not by a discharging resistor. When AC power is introduced normally, the energy consumption caused by the discharging resistor is overcome, and when AC power is disconnected, the X-capacitor can be discharged by the energy transfer unit. The present invention meets the requirement of "safety of information technology equipment", and especially, it offers great help to raise the efficiency of the converter having a bridgeless PFC conversion unit in the light-loaded status. Meanwhile, part of the original conversion unit of a conversion module in a converter can be used as the energy transfer unit, which simplifies the circuit greatly.

What have been stated above are only preferred embodiments of the present invention, but the patent scope of the present invention is not limited to this. So, any equivalent structure variation based on the content of the description and figures of the present invention should fall within the scope of the present invention.

What is claimed is:

1. A converter, comprising:
   a capacitor connected between a live line and a null line of AC power input terminals;
   a conversion module coupled to the capacitor and at least comprising an energy transfer unit and an energy storage component, wherein, the energy transfer unit, comprising a switching device, is coupled to the capacitor and the energy storage component;
   an AC power-off detecting unit connected with the AC power input terminals, which detects on-off status of AC power and generates an AC power-off signal; and
   a control unit coupled to the AC power-off detecting unit; wherein when disconnection of the AC power is detected by the AC power-off detecting unit, the AC power-off signal outputted from the AC power-off detecting unit triggers the control unit to output a switch driving signal, which controls operation of the energy transfer unit to transfer energy stored in the capacitor to the energy storage component, so that the capacitor is discharged;
   wherein the control unit comprises an intervention unit, a feedback regulation unit and a switching signal generation unit, wherein, the feedback regulation unit comprises a feedback voltage sampling unit, a reference voltage generation unit and a regulation unit; when the AC power is disconnected, the intervention unit intervenes to increase output voltage of the feedback regulation unit by decreasing feedback voltage received by the feedback regulation unit or increasing output voltage of the reference voltage generation unit, such that the switching signal generation unit generates a switch driving signal according to the output voltage of the feedback regulation unit, so as to control the operation of the switching device of the conversion module to transfer the energy stored in the capacitor to the energy storage component of the conversion module, and to discharge the capacitor.

2. The converter of claim 1, wherein the energy storage component is a capacitive element, when disconnection of the AC power is detected by the AC power-off detecting unit, the AC power-off signal outputted from the AC power-off detecting unit triggers the control unit to output the switch driving signal, which controls the operation of the energy transfer unit to enhance voltage of the capacitive element, so that the energy stored in the capacitor is transferred to the capacitive element to discharge the capacitor.

3. The converter of claim 2, wherein the control unit enhances the voltage of the capacitive element by increasing duty cycle of the switch driving signal.

4. The converter of claim 1, wherein the energy storage component is an inductive element.

5. The converter of claim 1, wherein the AC power-off detecting unit comprises:
   a capacitor voltage regulation circuit, converting a received AC power signal, and generating a voltage signal; and
   a timing circuit, receiving the voltage signal generated by the capacitor voltage regulation circuit, measuring time period of positive voltage of the AC power as well as that of negative voltage respectively, if the time period of the positive voltage or that of the negative voltage exceeds a predetermined time, the AC power disconnected is detected.

6. A capacitor discharging circuit used to discharge a capacitor connected between a live line and a null line of AC power input terminals of a converter, wherein the converter comprises a conversion module, coupled to the capacitor, which at least comprises an energy storage component and an energy transfer unit; the energy transfer unit, comprising a switching device, is coupled to the capacitor and the energy storage component; the capacitor discharging circuit comprises:
  an AC power-off detecting unit connected to the AC power input terminals of the converter, which detects on-off status of AC power and generates an AC power-off signal; and
  a control unit coupled to the AC power-off detecting unit, when disconnection of the AC power is detected by the AC power-off detecting unit, the AC power-off signal outputted from the AC power-off detecting unit triggers the control unit to output a switch driving signal, which controls operation of the energy transfer unit to transfer energy stored in the capacitor to the energy storage component of the conversion module, so that the capacitor is discharged;
  wherein the control unit comprises an intervention unit, a feedback regulation unit and a switching signal generation unit, wherein the feedback regulation unit comprises a feedback voltage sampling unit, a reference voltage generation unit and a regulation unit; when the AC power is disconnected, the intervention unit intervenes to increase output voltage of the feedback regulation unit by decreasing feedback voltage received by the feedback regulation unit or increasing output voltage of the reference voltage generation unit, such that the switching signal generation unit generates a switch driving signal according to the output voltage of feedback regulation unit, so as to control operation of the switching device of the conversion module to transfer the energy stored in the capacitor to the energy storage component of the conversion module, and to discharge the capacitor.

7. The capacitor discharging circuit of claim 6, wherein the capacitor is an X-capacitor.

8. The capacitor discharging circuit of claim 6, wherein the energy storage component is a capacitive element, when disconnection of the AC power is detected by the AC power-off detecting unit, the AC power-off signal outputted from the AC power-off detecting unit triggers the control unit to output the switch driving signal, which controls the operation of the energy transfer unit to enhance voltage of the capacitive element, so that the energy stored in the capacitor is transferred to the capacitive element of the conversion module and the capacitor is discharged.

9. The capacitor discharging circuit of claim 8, wherein the voltage of the capacitive element is raised by increasing duty cycle of the switch driving signal outputted from the control unit.

10. The capacitor discharging circuit of claim 6, wherein the energy storage component is an inductive element.

11. The capacitor discharging circuit of claim 6, wherein the AC power-off detecting unit comprises:
  a capacitor voltage regulation circuit, converting a received AC power signal, and generating a voltage signal; and
  a timing circuit, receiving the voltage signal generated by the capacitor voltage regulation circuit, measuring time period of positive voltage of the AC power as well as that of negative voltage respectively, if the time period of the positive voltage or that of the negative voltage exceeds a predetermined time, the AC power disconnected is detected.

12. A converter, comprising:
  a capacitor connected between a live line and a null line of AC power input terminals;
  a conversion module coupled to the capacitor and at least comprising an energy transfer unit and an energy storage component, wherein, the energy transfer unit, comprising a switching device, is coupled to the capacitor and the energy storage component;
  an AC power-off detecting unit connected with the AC power input terminals, which detects on-off status of AC power and generates an AC power-off signal; and
  a control unit coupled to the AC power-off detecting unit; wherein when disconnection of the AC power is detected by the AC power-off detecting unit, the AC power-off signal outputted from the AC power-off detecting unit triggers the control unit to output a switch driving signal, which controls operation of the energy transfer unit to transfer energy stored in the capacitor to the energy storage component, so that the capacitor is discharged;
  wherein the control unit comprises an intervention unit and a switching signal generation unit, when the AC power is disconnected, the intervention unit intervenes in the switching signal generation unit to generate the switch driving signal according to the AC power-off signal to control the operation of the energy transfer unit, such that the energy stored in the capacitor is transferred to the energy storage component of the conversion module.

13. The converter of claim 12, wherein the energy storage component is a capacitive element, when disconnection of the AC power is detected by the AC power-off detecting unit, the AC power-off signal outputted from the AC power-off detecting unit triggers the control unit to output the switch driving signal, which controls the operation of the energy transfer unit to enhance voltage of the capacitive element, so that the energy stored in the capacitor is transferred to the capacitive element to discharge the capacitor.

14. The converter of claim 13, wherein the control unit enhances the voltage of the capacitive element by increasing duty cycle of the switch driving signal.

15. The converter of claim 12, wherein the energy storage component is an inductive element.

16. The converter of claim 12, wherein the AC power-off detecting unit comprises:
  a capacitor voltage regulation circuit, converting a received AC power signal, and generating a voltage signal; and
  a timing circuit, receiving the voltage signal generated by the capacitor voltage regulation circuit, measuring time period of positive voltage of the AC power as well as that of negative voltage respectively, if the time period of the positive voltage or that of the negative voltage exceeds a predetermined time, the AC power disconnected is detected.

17. A capacitor discharging circuit used to discharge a capacitor connected between a live line and a null line of AC power input terminals of a converter, wherein the converter comprises a conversion module, coupled to the capacitor, which at least comprises an energy storage component and an energy transfer unit; the energy transfer unit, comprising a switching device, is coupled to the capacitor and the energy storage component; the capacitor discharging circuit comprises:
- an AC power-off detecting unit connected to the AC power input terminals of the converter, which detects on-off status of AC power and generates an AC power-off signal; and
- a control unit coupled to the AC power-off detecting unit, when disconnection of the AC power is detected by the AC power-off detecting unit, the AC power-off signal outputted from the AC power-off detecting unit triggers the control unit to output a switch driving signal, which controls operation of the energy transfer unit to transfer energy stored in the capacitor to the energy storage component of the conversion module, so that the capacitor is discharged;
- wherein the control unit comprises an intervention unit and a switching signal generation unit, when the AC power is disconnected, the intervention unit intervenes in the switching signal generation unit to generate the switch driving signal according to the AC power-off signal to control the operation of the energy transfer unit, such that energy stored in the capacitor is transferred to the energy storage component of the conversion module.

18. The capacitor discharging circuit of claim 17, wherein the capacitor is an X-capacitor.

19. The capacitor discharging circuit of claim 17, wherein the energy storage component is a capacitive element, when disconnection of the AC power is detected by the AC power-off detecting unit, the AC power-off signal outputted from the AC power-off detecting unit triggers the control unit to output the switch driving signal, which controls the operation of the energy transfer unit to enhance voltage of the capacitive element, so that the energy stored in the capacitor is transferred to the capacitive element of the conversion module and the capacitor is discharged.

20. The capacitor discharging circuit of claim 19, wherein the voltage of the capacitive element is raised by increasing duty cycle of the switch driving signal outputted from the control unit.

21. The capacitor discharging circuit of claim 17, wherein the energy storage component is an inductive element.

22. The capacitor discharging circuit of claim 17, wherein the AC power-off detecting unit comprises:
- a capacitor voltage regulation circuit, converting a received AC power signal, and generating a voltage signal; and
- a timing circuit, receiving the voltage signal generated by the capacitor voltage regulation circuit, measuring time period of positive voltage of the AC power as well as that of negative voltage respectively, if the time period of the positive voltage or that of the negative voltage exceeds a predetermined time, the AC power disconnected is detected.

* * * * *